(12) United States Patent
Chianura et al.

(10) Patent No.: US 12,181,329 B2
(45) Date of Patent: Dec. 31, 2024

(54) METHOD TO WEIGH CONTAINERS

(71) Applicant: I.M.A. INDUSTRIA MACCHINE AUTOMATICHE S.P.A., Ozzano dell'Emilia (IT)

(72) Inventors: Mattia Chianura, Ozzano dell'Emilia (IT); Claudio Trebbi, Ozzano dell'Emilia (IT)

(73) Assignee: I.M.A. INDUSTRIA MACCHINE AUTOMATICHE S.P.A., Ozzano del'Emilia (IT)

( * ) Notice: Subject to any disclaimer, the term of this patent is extended or adjusted under 35 U.S.C. 154(b) by 431 days.

(21) Appl. No.: 17/613,334

(22) PCT Filed: May 19, 2020

(86) PCT No.: PCT/IT2020/050127
§ 371 (c)(1),
(2) Date: Nov. 22, 2021

(87) PCT Pub. No.: WO2020/240601
PCT Pub. Date: Dec. 3, 2020

(65) Prior Publication Data
US 2022/0214208 A1  Jul. 7, 2022

(30) Foreign Application Priority Data

May 27, 2019 (IT) .................... 102019000007266

(51) Int. Cl.
*G01G 15/04* (2006.01)
*G01G 17/04* (2006.01)

(52) U.S. Cl.
CPC ............. *G01G 15/04* (2013.01); *G01G 17/04* (2013.01); *G01G 2015/042* (2013.01)

(58) Field of Classification Search
CPC ........ G01G 17/00; G01G 21/22; G01G 19/52; G01G 17/04; G01G 15/04; G01G 15/042
USPC .............................................................. 177/1
See application file for complete search history.

(56) References Cited

U.S. PATENT DOCUMENTS

| | | | | |
|---|---|---|---|---|
| 4,530,202 A | * | 7/1985 | Powell .................. | B67C 7/0073 141/90 |
| 5,285,825 A | * | 2/1994 | Townsley ............. | G01G 15/006 141/105 |
| 5,687,779 A | * | 11/1997 | Andersson ........... | A23C 9/1508 141/105 |
| 5,771,657 A | * | 6/1998 | Lasher ................... | B65B 61/20 53/493 |
| 6,148,877 A | | 11/2000 | Bethke | |
| (Continued) | | | | |

OTHER PUBLICATIONS

International Search Report and Written Opinion corresponding to International Patent Application No. PCT/IT2020/050127, mailed Dec. 1, 2020.

*Primary Examiner* — Jacques M Saint Surin
(74) *Attorney, Agent, or Firm* — MCANDREWS HELD & MALLOY, LTD

(57) ABSTRACT

Method to weigh containers (C) in a processing line (10) which comprises a filling and weighing station (12) for said containers (C), said method providing to make available a plurality of containers (C) which are initially weighed in order to determine the tare weight and subsequently filled sequentially, determining the weight of the product metered into each container (C).

27 Claims, 9 Drawing Sheets

(56) References Cited

U.S. PATENT DOCUMENTS

| | | | |
|---|---|---|---|
| 6,418,701 B1* | 7/2002 | Navarro | B65B 39/12 |
| | | | 53/367 |
| 6,681,550 B1* | 1/2004 | Aylward | B65B 5/103 |
| | | | 53/244 |
| 6,799,413 B2* | 10/2004 | Aylward | B65B 35/26 |
| | | | 53/244 |
| 7,185,477 B2* | 3/2007 | Rice | G06Q 10/087 |
| | | | 53/494 |
| 7,313,898 B1* | 1/2008 | Eller | B65B 21/06 |
| | | | 53/151 |
| 7,878,366 B2* | 2/2011 | Cicognani | B65B 5/08 |
| | | | 53/244 |
| 9,493,254 B2* | 11/2016 | Boira Bonhora | G01G 15/04 |
| 9,665,933 B2* | 5/2017 | Herrmann | G01N 21/9045 |
| 10,641,648 B2* | 5/2020 | Landini | G01G 21/28 |
| 2015/0034207 A1 | 2/2015 | Boira Bonhora | |
| 2015/0353212 A1 | 12/2015 | Williamson | |
| 2018/0229866 A1 | 8/2018 | Eberhardt et al. | |
| 2019/0152724 A1 | 5/2019 | Philipp et al. | |

\* cited by examiner

METHOD TO WEIGH CONTAINERS

FIELD OF THE INVENTION

The present invention concerns a weighing method, able to weigh one or more containers configured to contain products of various kinds, both fluid, solid and powdered, for example drugs, food, or drinks.

The method described here can be carried out at a filling and weighing station of a processing line which can comprise a plurality of further processing stations, including, for example, also at least one storage station for empty containers and a subsequent station for capping or closing the filled containers.

The method described here is suitable to be used, for example, in association with a machine for filling the containers and/or a machine for automatically transporting the containers as above to and from one or more of the processing stations as above.

By the term product or substance we mean any liquid, semi-solid, gelatinous or solid composition, in which case it can be for example in powder or in grains, and which can be of vegetable and/or animal and/or chemical origin.

By way of non-restrictive example only, the method according to the present invention can be used in the pharmaceutical, cosmetic, health, chemical and/or food sectors.

BACKGROUND OF THE INVENTION

In the industrial field of the automated filling of containers various equipment or machinery are known configured as processing lines inside which one or more containers are moved to and from one or more processing stations, advantageously located in succession.

The processing stations can comprise, for example, a storage station for empty containers, one or more weighing stations, a station for filling the containers, a station for closing each container and a packaging station for the filled containers, ready for delivery, or for storage in a warehouse of finished products.

The containers in question can be vials, for example bottles, or in any case containers having a similar or comparable shape and able to contain fluid products, in particular liquids, or solids and products in powder or in gel form.

The movement of the containers between the processing stations, and possibly also inside them, is generally carried out with mechanical and motorized transport devices, or apparatuses, which comprise, for example, conveyor belts, turntables, or carousels, gears, chains, slides, lifters, mechanical arms, possibly robotic, and other mechanical members.

Irrespective of the type of transport devices used, it is necessary that the containers, which can be at least initially positioned in suitable seatings of a container-holder tray, are picked up by means of appropriate pick-up elements, individually or in groups, for the subsequent filling, weighing and closing operations.

The containers are then picked up to be moved to the subsequent processing stations, in particular for filling and weighing.

One of the important aspects in such filling machines is, in fact, the need to weigh the containers before they are filled, after they have been filled and possibly during the filling step, in order to accurately determine the quantity of product metered in each of them. In addition, especially in certain sectors, such as the pharmaceutical one for example, each weighing must be very accurate and precise, with tolerances in the range of one milligram, in order to obtain a correct dosage.

Generally, in this context, a plurality of weighing elements, or scales, are used, for example load cells, on each of which an empty container is disposed. Typically, metering members are provided, each of which is configured to meter a determinate quantity of product in a respective empty container. In practice, once the tare weight of a container has been measured, the product is metered into it, after which the container thus filled is weighed and, by calculating the difference with respect to the tare weight, the net weight of the metered product is determined. This sequence of operations is repeated for all the containers to be processed, which are supplied individually or in groups, considerably increasing the process times and reducing the productivity of the filling machine and, overall, of the processing line.

Furthermore, using a plurality of weighing elements, each of which is used to weigh both the tare and also the gross weight of a specific one of the individual containers, can entail both a multiplication of the measuring errors, due to the plurality of weighing elements used, and also a high number of measuring errors correlated at least to the high number of weighing operations to be carried out. A propagation of measuring discrepancies and uncertainty can also occur in the exact quantity of metered product, with particular reference to the accuracy and repeatability of the measurement of the tare and gross weight of the same container, by means of the different weighing elements used.

This aspect is all the more critical, for example, in the pharmaceutical or related sector, where the quantities of the components to be metered are often minimal, and the required tolerances are also minimal.

Another aspect to consider is that, often, the containers are supplied in the container-holder tray according to a so-called "quincunx" spatial configuration that provides staggered adjacent rows of containers, to optimize the occupation of the volumes.

This spatial disposition, although it allows to maximize the number of containers disposed in the container-holder tray, makes it difficult to pick them up so that, in the state of the art, it is possible to pick up only a small number of containers at a time disposed in the same row. This is reflected in the subsequent steps of filling, weighing and closing the containers picked up which steps are performed only on a small number of containers.

This aspect also considerably increases the process times of a given group of containers, since only a few can be moved at a time, reducing the overall productivity. Furthermore, this aspect also considerably increases the number of movements, with a consequent increase in energy consumption, greater wear and greater overheating of the motorizing units of the movement apparatuses involved.

There is therefore a need to perfect a method for weighing containers in a processing line which can overcome at least one of the disadvantages of the state of the art.

In particular, one purpose of the present invention is to perfect a method for weighing a plurality of containers which reduces the number of possible errors in measuring the weight.

Another purpose of the present invention is to provide a weighing method which is not affected by, or in any case minimizes, uncertainties or differences in measuring the weight.

Yet another purpose of the present invention is to provide a weighing method which reduces the process times of a given group of containers.

Yet another purpose of the present invention is to provide a weighing method which minimizes the number of movements required.

The Applicant has studied, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the present invention or variants to the main inventive idea.

In accordance with the above purposes, embodiments described here concern a method to weigh containers in a processing line which comprises at least one station for filling and weighing the containers, which is provided with filling means and weighing means comprising a weighing plate.

The weighing plate is provided with a plurality of positioning seatings each configured to receive and support a corresponding container.

The method as above comprises:
  making available a plurality of empty containers and moving such plurality of containers toward the filling and weighing station to cooperate with the filling means and the weighing means;
  positioning the containers in each positioning seating of the weighing plate as above of the weighing means;
  weighing the tare, by means of the weighing means, of the containers inserted in each positioning seating at a single time, in particular weighing all the empty containers initially present in the respective positioning seatings of said weighing plate;
  sequentially filling each of the containers by means of the filling means, progressively determining, by means of the weighing means, the weight of product metered into each specific container at each filling step, without weighing the tare of each container.

Advantageously, this method allows first of all to only weigh the tare once, for a given group of containers present in the respective multiple positioning seatings of a weighing plate associated with a specific scale, and also reduces the errors in measuring the weight of product metered into each container. This is primarily because a single scale is used to weigh a plurality of containers disposed in the respective positioning seatings of the weighing plate, instead of a plurality of weighing elements each dedicated to weighing a single container. In fact, since the net weight of each filling operation is advantageously calculated by calculating the difference between two weight measurements taken, with the same scale, before and after the specific filling operation, any measurement errors are subtracted instead of added up as can occur in the state of the art. Furthermore, the number of weighing operations that are performed for a given quantity of containers to be processed is reduced.

Furthermore, the method is advantageous since it provides to make available, move and weigh the tare of, at a single time, a greater number of containers than those that can be moved by the methods of the state of the art, this allowing to reduce the number of movements involved, as well as the overall movement times and increase productivity.

In particular, it is advantageous to reduce the number of movements since this entails, in addition to a reduction in operating times, also lower energy consumption, less wear and less overheating of the motorizing units of the movement apparatuses involved. This is all the more advantageous, for example, in the event that said movements are carried out by means of automated or robotized apparatuses.

Other embodiments, also, concern a station for filling and weighing containers that comprises filling means and weighing means. The weighing means comprise a weighing plate provided with a plurality of positioning seatings each configured to receive and support a corresponding container. The filling and weighing station, also, comprises means configured to move the containers with respect to the filling means and weighing means.

Still other embodiments concern a processing line for processing containers comprising a station for storing and picking up the containers and a station for filling and weighing the containers as described here.

BRIEF DESCRIPTION OF THE DRAWINGS

These and other aspects, characteristics and advantages of the present invention will become apparent from the following description of some embodiments, given as a non-restrictive example, with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention and as a non-limiting example also in relation to the embodiments, details of construction, phraseology and terminology. For example, one or more characteristics shown or described, insomuch as they are part of one embodiment, can be varied or adopted on, or in association with, other embodiments to produce other embodiments. It is understood that the present invention shall include all such modifications and variants.

Embodiments described here using the attached drawings concern a method to weigh containers C in a line 10 for processing containers C, a station 12 for filling and weighing the containers C and a line 10 for processing the containers C.

Figure 1:
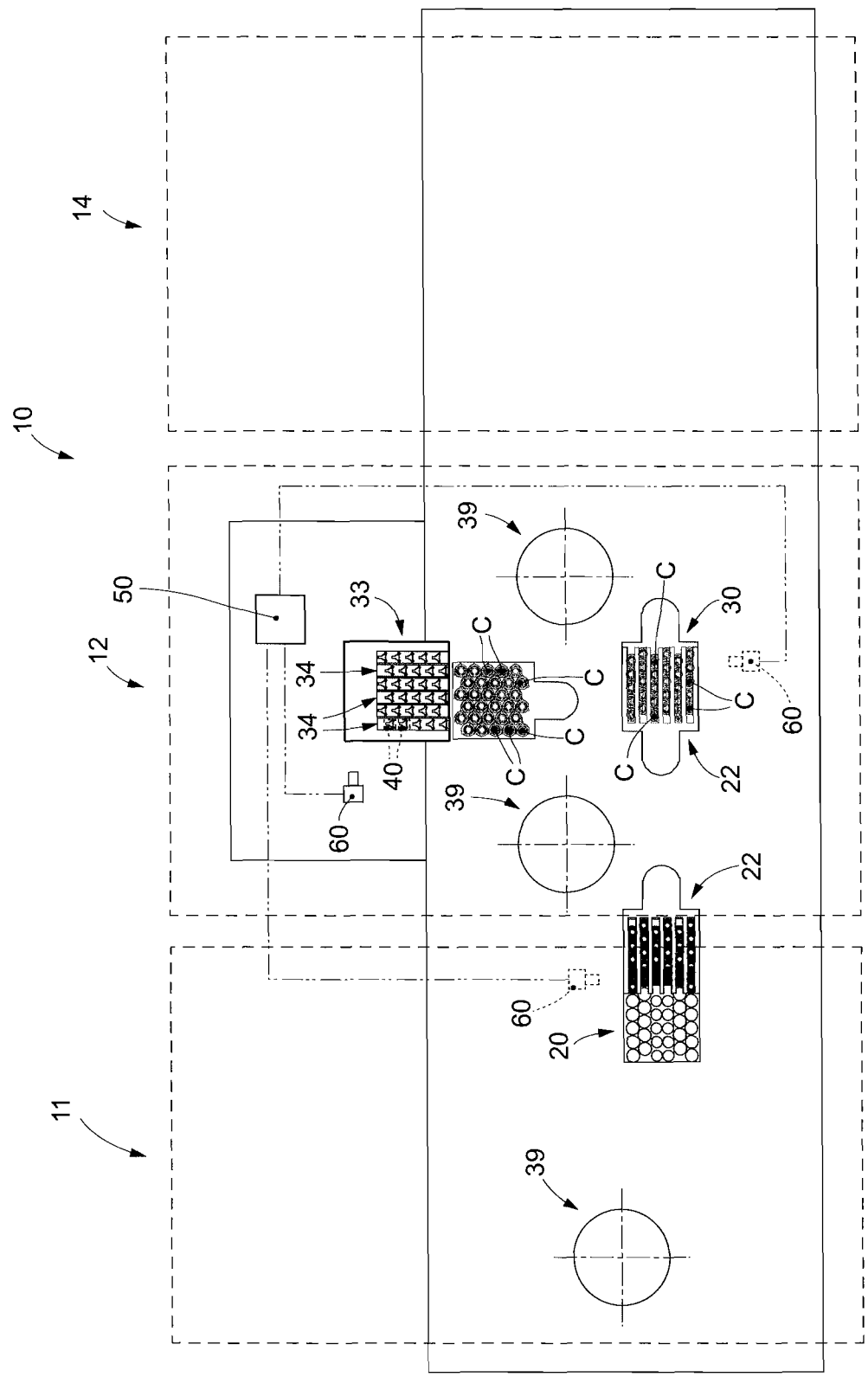
FIG. 1 is a schematic top view of a line for processing containers where the method to weigh containers in accordance with embodiments described here is carried out at least between a storage and pickup station and a station for filling and weighing containers.
Figure 16:
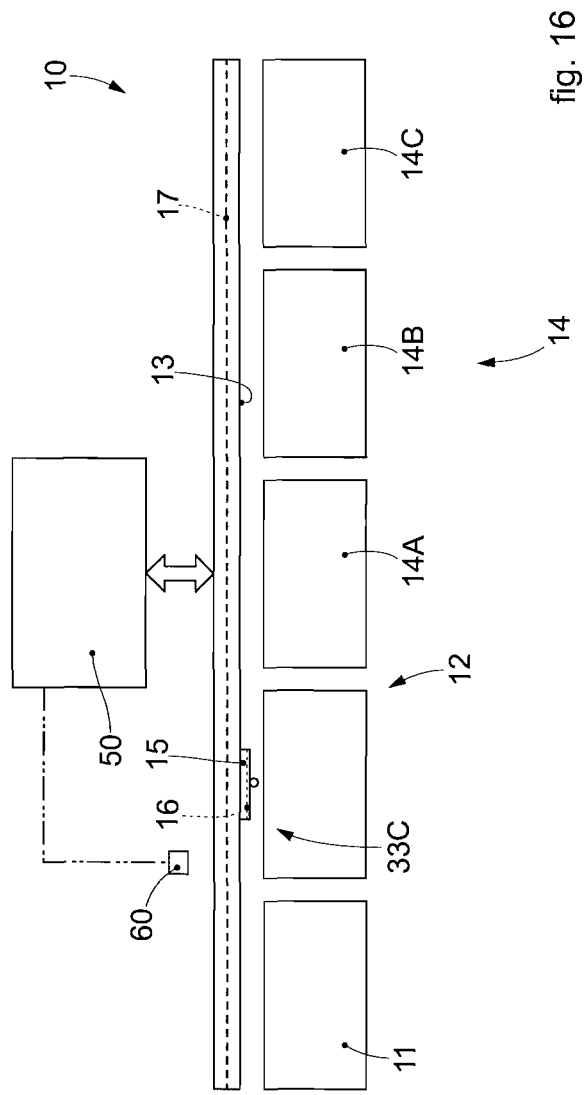
FIG. 16 is a block diagram that shows a weighing apparatus according to the present invention associated with a filling machine configured to automatically fill one or more containers.

This processing line 10 can also comprise, in addition to the filling and weighing station 12, a station 11 for storing and picking up the empty containers and possible other processing stations 14, 14A, 14B, 14C, such as for example a station for closing or capping the containers C, possibly a labeling station, a packaging station or other stations configured to perform other operations (see for example FIGS. 1 and 16).

In accordance with possible embodiments, the processing line 10 can, also, comprise a plurality of movement means 39, schematically shown in FIG. 1. Such movement means 39 can be positioned, for example, at least in correspondence with the processing stations 11, 12 as above.

Such movement means 39 are configured to move in space, with respect to the processing stations as above, trays, plates or other devices or means in general able to support and position, preferably in a stable and defined manner, a plurality of containers C, described in detail below.

The movement means 39 can, for example, be chosen in a group comprising automated movement devices, robotized movement devices, in particular anthropomorphic robots, magnetic or electric movement devices or other known devices or a combination of such devices.

The filling and weighing station 12 can comprise, or be associated or connected remotely to, a command and control unit 50, or central processing unit or similar control means, configured to control and manage the functioning at least of the filling and weighing station 12.

For example, the command and control unit 50 can control and command the drive of said movement means 39, in particular in accordance with a work cycle that is pre-set and/or can be selected on each occasion, also as a function of the product to be metered and the batch of containers C to be processed.

It should also be noted that here and hereafter in the present description, the filling and weighing station 12 can be understood as a station in which, in addition to filling, a weighing operation is performed both before (tare), when the containers are empty, and also after the containers are filled (gross weight). In this specific case, the overall purpose of the weighing is to detect the net weight of product which is metered into each of the containers C; typically, the gross weight is measured, once the product has been metered into a container C and, knowing the measured weight before the filling, for example of the single container C, it is possible to use this measured weight before the filling as reference or tare and, on each occasion, calculate based on difference, with respect to the gross weight, the net weight of product metered into each container C. This detection of the weight and determination of the net weight of metered product can be managed and controlled by the command and control unit 50, which receives signals correlated to the weight measurements carried out.

We must, also, clarify that the expression filling and weighing station 12 used in the present description should not be considered in a limiting sense. For example, this expression can contemplate both the case in which the filling and weighing station 12 is equipped with weighing means and filling means disposed in direct cooperation with and proximity to each other, and also the case in which the filling and weighing station 12 provides two zones, or sub-stations, distanced, separated or far apart from each other, of which a first one provided with weighing means to weigh the tare of the containers C and a second one provided with filling means and weighing means, to fill and weigh the quantity of product metered into each of the containers C.

Figure 2:
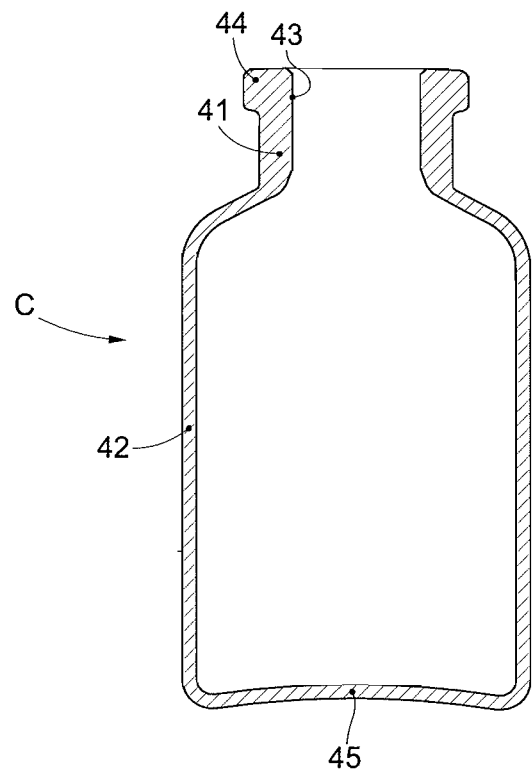
FIG. 2 is a section of a container which can be used in the embodiments described here.

Furthermore, in accordance with embodiments described here, we will refer, by way of a non-limiting example, to the type of container C which can be better seen for example in FIG. 2, where the container C is configured as a bottle or vial able to contain fluid products, in particular liquids, or solid and powder products or in gel form. In these possible embodiments, the container C has a neck 41 which protrudes from a containing body 42 and a mouth 43. At the upper part, in correspondence with the mouth 34, the neck 41 has a protruding annular edge 44, while in an opposite position there is a bottom end 45. It is evident that the containers C can also have other shapes and sizes, possibly not similar or comparable to that of a bottle or vial.

Figure 3:
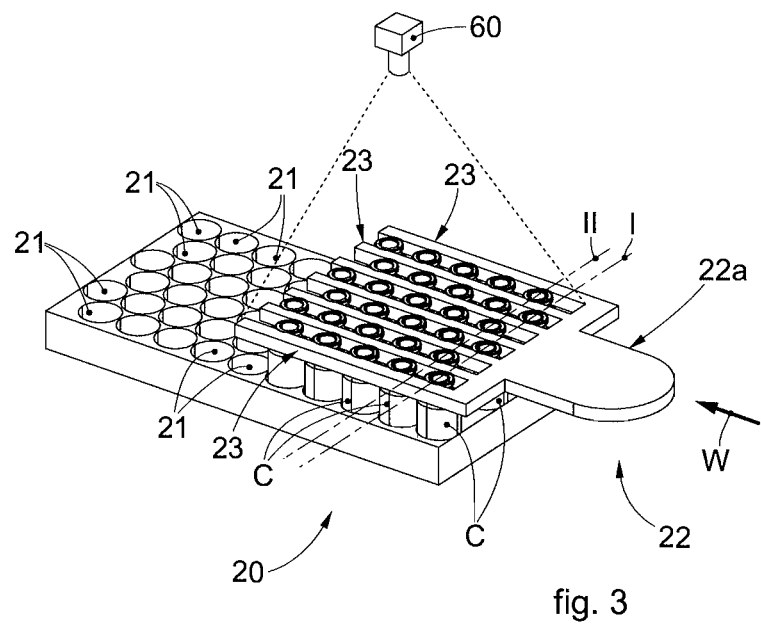
FIG. 3 is a perspective view of a step of cooperation between a container-holding tray and extraction means in the embodiments described here.
Figure 4:
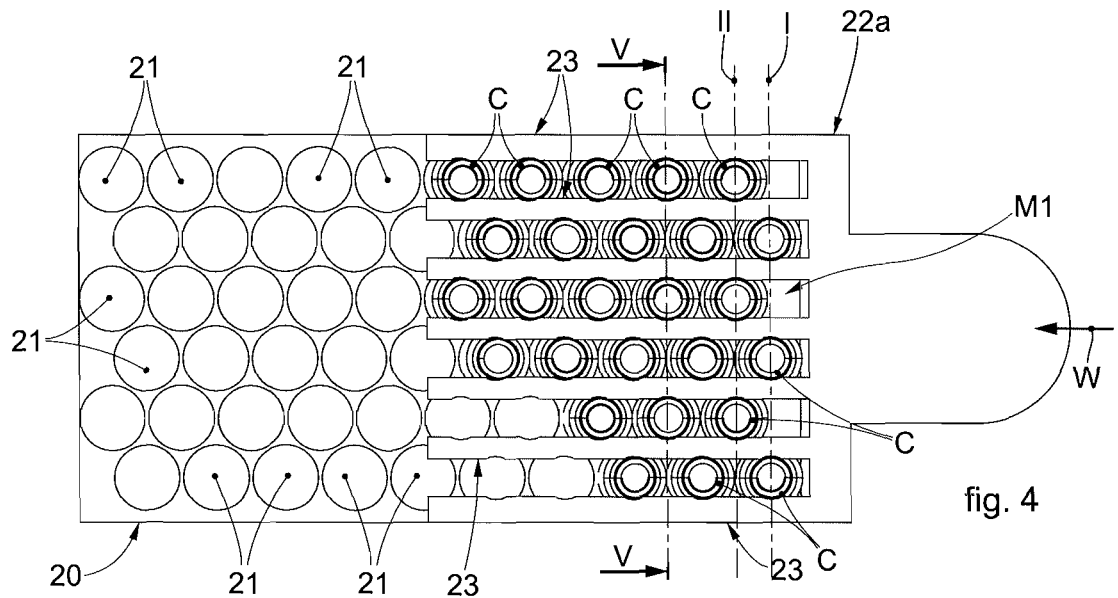
FIG. 4 is a top plan view of a step of cooperation between a container-holding tray and extraction means in the embodiments described here.
Figure 5:
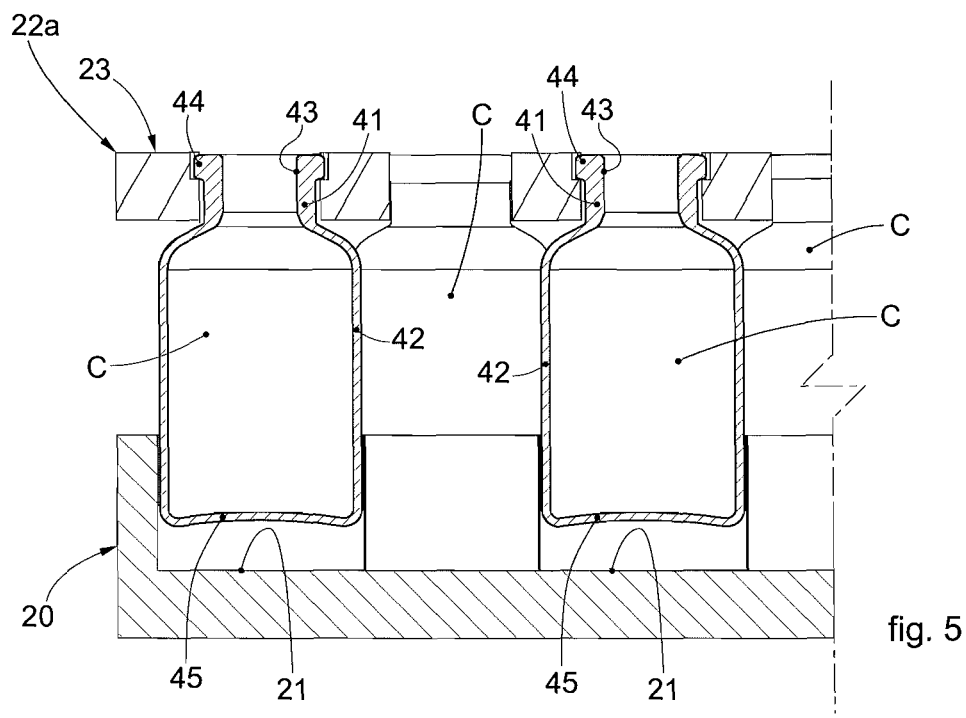
FIG. 5 is a section along line VI-VI of FIG. 4.

In accordance with some embodiments, the method provides to use a container-holding tray 20 (FIGS. 1, 3 and 4). The latter can be associated with the storage and pick-up station 11 and/or with the filling and weighing station 12 (FIG. 1).

The movement means 39 can be advantageously provided and configured to move the container-holding tray 20 as above.

A determinate number, even several units or several tens of units, of empty containers C is pre-positioned on the container-holding tray 20 to form an ordered group of containers C according to a positioning matrix M1 (FIG. 3). The positioning matrix M1 is defined for example by the disposition of the containers C according to a pattern of rows and columns in the container-holding tray 20. Here and hereafter in description, the term "row" can also be used to identify rows or columns of the containers C (see for example rows I, II in FIGS. 3 and 4), where by row we mean a succession of elements aligned with each other, in this specific case containers C. This pattern can, for example, provide that the containers C of one row are offset with respect to those of the two adjacent rows, that is one element of one row is disposed in the space between two elements of a subsequent or previous row, so as to optimize the spatial disposition and make sure that the container-holding tray 20 is able to accommodate the highest possible number of containers C. Such spatial disposition of containers C, typical of this sector, is also called, in jargon, a "quincunx" disposition.

The container-holding tray 20 is provided with a plurality of housing seatings 21 for receiving and positioning the containers C. The housing seatings 21 are reciprocally disposed according to the configuration of the positioning matrix M1 as above and configured to receive and support respective containers C with respect to the bottom end 45 thereof, in particular providing that the containers C have the side of the mouth 43 facing upward.

The container-holding tray 20, and in particular the respective housing seatings 21, can be conformed in various ways.

In one possible example embodiment, the housing seatings 21 can be able to determine a precise and defined space where the containers C can rest, without having any function of lateral support thereof. For example, in the "quincunx" disposition, although the containers C are not positioned in contact, they are very close to each other, each one self-supporting the other, in the event of impact.

Alternatively, in another example embodiment the housing seatings 21 can be obtained in the thickness of the container-holding tray 20 and have a depth which advantageously allows the lateral support of the containers C when they are positioned in them. For example, the housing seatings 21 can have a circular section in accordance with a substantially cylindrical shape of the containers C. The housing seating 21 can have a transverse size slightly larger than the transverse size of the container C so as to advantageously allow a stable positioning thereof, but with play in order to facilitate its subsequent pick-up.

It should be noted here that the containers C are disposed in the container-holding tray 20 in the manner and orientation described above either because they are already supplied in this manner, or because they are subjected to an overturning operation from an inverted condition, with the mouth 43 facing downward, to a condition with the mouth 43 facing upward.

The weighing method described here provides to use extraction means 22 configured to engage at least one part of the containers C disposed on the container-holding tray 20, in order to extract a plurality of such containers C and transport them and make them available at the filling and weighing station 12. These extraction means 22 can be associated with the storage and pick-up station 11 and/or with the filling and weighing station 12 and/or be mobile at least between these stations.

In some embodiments, the extraction means 22 as above are configured reciprocally mobile with respect to the container-holding tray 20 along a pick-up direction W (FIGS. 3 and 4). According to possible embodiments, the pick-up direction W can be, in particular, transverse, more particularly orthogonal, to a respective row of containers C of the positioning matrix M1. In this specific case, this pick-up direction W can be transverse, more particularly orthogonal, to the perimeter of the container-holding tray 20.

In possible embodiments, the extraction means 22 are conformed to pick-up at least two containers C disposed on at least one respective row of the positioning matrix M1.

In other possible embodiments, the extraction means 22 are conformed to pick-up, from the container-holding tray 20, at least two containers C disposed on two parallel and consecutive rows I, II of the positioning matrix M1, of which a first container C is positioned in a first row I and a second container C is positioned in a second row II. The first row I as above is, with reference to the pick-up direction W, more external, in the positioning matrix M1, than the second row II, (see for example FIGS. 3 and 4).

According to some embodiments, the extraction means 22 comprise, or are configured as, an extraction gripper 22a as shown for example in FIGS. 3 and 4.

Such extraction means 22 can comprise, or be associated with, a specific one of the movement means 39, which is suitable to move the extraction gripper 22a according to requirements, as explained below.

According to possible embodiments, the extraction means 22 are configured to carry out at least one first relative movement of engagement with respect to the container-holding tray 20 in order to engage at least one part of the group of containers C disposed in the housing seatings 21 of the container-holding tray 20, retaining the containers C engaged by the extraction gripper 22. In particular, the extraction means 22 are configured to pick up containers C from at least one row of containers C, or from at least two parallel and consecutive rows I, II of containers C. Alternatively, we do not exclude that the first relative movement as above is achieved by moving the container-holding tray 20 with respect to the extraction gripper 22a.

Preferably, the extraction gripper 22a, thanks to its conformation, is able to simultaneously pick up more than one, in particular more than two, even more in particular more than three or more, being able to even pick up all the containers C, of one row I and possibly also more than one, in particular more than two, even more in particular more than three or more, being able to even pick all the containers C, of one row II parallel to row I, in order to reduce the processing and movement times, as well as the number of movements. Although here we have described the pick-up from one row, or two rows I, II, it is clear that the present invention can be applied in order to also pick up containers C from more than two rows, for example three, four, five, six or even more than six, and also from all the rows of the container-holding tray 20.

The extraction gripper 22a is configured to also carry out at least a second relative movement with respect to the container-holding tray 20 so as to extract from the container-holding tray 20 the containers C positioned in the housing seatings 21, to move them to the subsequent processing station, in this specific case to the filling and weighing station 12. In possible implementations, for this purpose the extraction gripper 22a can be moved with a lifting movement, or alternatively the extraction gripper 22a can be kept stationary and the container-holding tray 20 can be moved, in particular with a downward movement.

As described above, the extraction gripper 22a can be moved by movement means or devices 39 associated with it, which allow both a relative movement thereof with respect to the containers C to be engaged and picked up, in the event the extraction gripper 22a is moved with respect to the container-holding tray 20, and also a movement in space to reach the filling and weighing station 12 for the containers C.

In accordance with some embodiments, at least in the first relative movement of engagement as above, the extraction gripper 22a is configured to be operationally aligned with respect to the rows, lines or columns, of the positioning matrix M1 of the container-holding tray 20 so as to accommodate inside it respective rows of containers C, as shown in FIG. 4.

In some embodiments, the filling and weighing station 12 comprises weighing means 33, described in detail hereafter (FIGS. 8-14).

Figure 8:
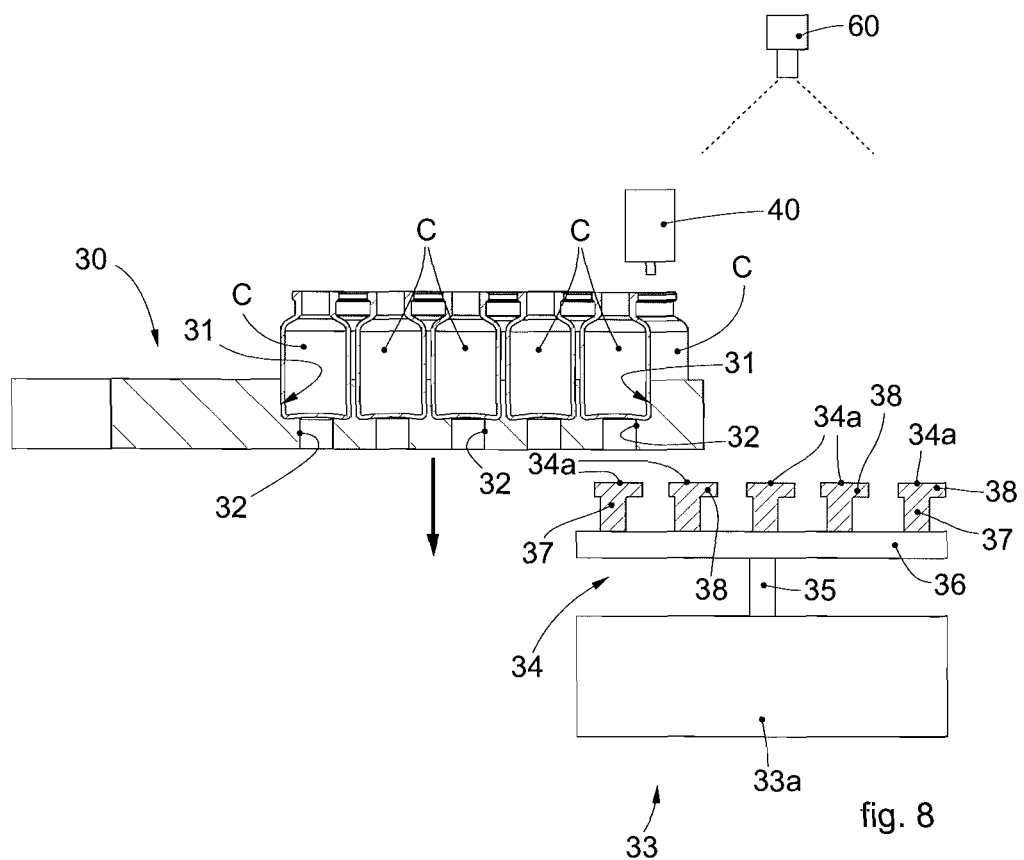
FIG. 8 is a schematic section of a step of the weighing method according to embodiments described here.
Figure 9:
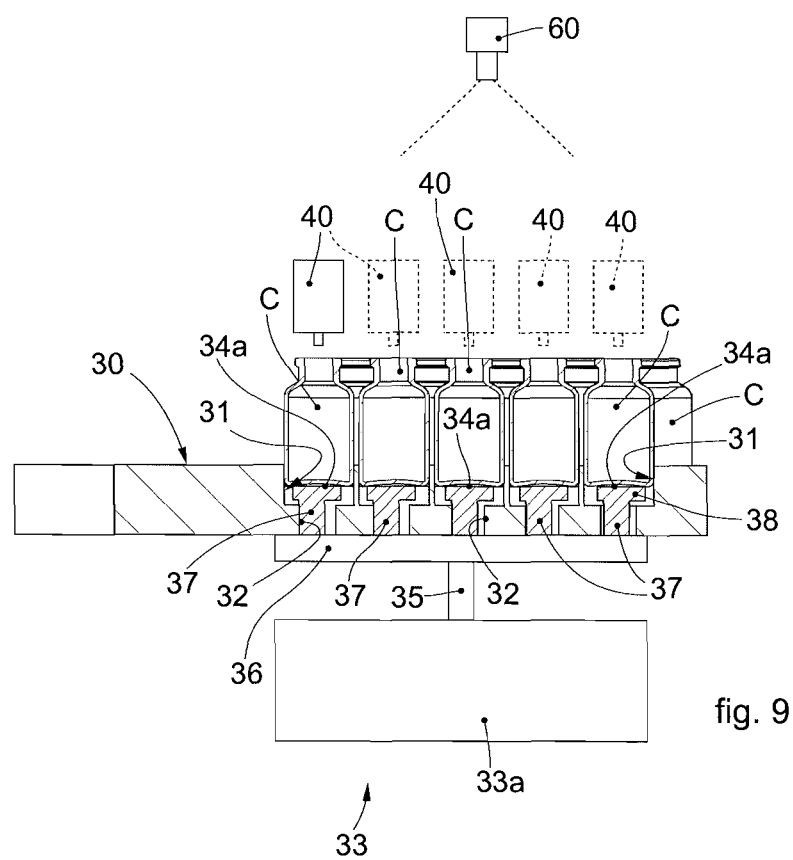
FIG. 9 is a schematic section of another step of the weighing method according to the embodiments described here.

Furthermore, the filling and weighing station 12 can comprise filling means 40, configured to fill with metered quantities each of said containers C, schematically shown in FIG. 1 and also visible in FIGS. 8 and 9. Such filling means 40 can be for example nozzles or similar delivery or metering devices.

For example, the filling means 40 can be a single delivery or metering device in a fixed position, or an array of delivery or metering devices disposed in fixed positions, or one or more delivery devices positioned mobile, in order to move in correspondence with the respective containers C to be filled. For example, FIG. 8 shows a filling mean 40 and FIG. 9 shows a filling mean 40 with a continuous line and with a possible plurality of filling means 40 with a dashed line.

Furthermore, although the filling means 40 are shown by way of example in FIGS. 1, 8, 9 in substantial correspondence with the weighing means 33, so that in fact a same container C is static at least with respect to the weighing means 33 during the operations of weighing the tare, filling and weighing of the gross weight, the present invention can also contemplate embodiments in which, always in the context of the filling and weighing station 12 as defined in the present description, the filling means 40 are positioned distanced and/or remote with respect to the weighing means 33 for example used to carry out the weighing of the tare and, therefore, a same container C can be moved with respect to weighing means 33 provided to weigh the tare and to filling means 40 and weighing means 33 to weigh the gross weight and therefore obtain the net weight of metered product.

For example, there can be provided autonomous weighing means 33 distanced from the filling means 40 and, once the tare of the containers C has been weighed only once as described here, the same containers C can be moved in correspondence with the filling means 40 where a quantity of product is metered into a specific one of the containers C.

The latter are subsequently moved to the weighing means 33, where the gross weight of the specific filled container C is weighed, from which to obtain the net weight. Then the containers C are again moved to the filling means 40, where another step of filling another container C is performed. Finally, the containers C are again moved to the weighing means 33, where the gross weight of the specific other filled container C is weighed, proceeding progressively in this manner until all the containers of a given group of containers C are filled and weighed.

The filling and weighing station 12 can, also, include means configured to move the containers C with respect to the filling means 40 and to the weighing means 33. In the embodiments described using FIGS. 1-14 such means configured to move the containers C can be, for example, the extraction means 22 as above, or other support means, or the support plate 30, as described in detail below.

Advantageously, in all the embodiments described here the weighing means 33 and the filling means 40 can be managed and controlled by the command and control unit 50 as above, also in relation to the reciprocal operations. The command and control unit 50 can coordinate the movement of the plurality of containers C according to the modes described here, also in relation to the various operations, and to their specific sequence, which are carried out at the filling and weighing station 12 and in particular by means of the filling means 40 and weighing means 33.

In accordance with possible embodiments, the filling and weighing station 12 can also comprise, or be associated with or in cooperation with, support means, in particular a support plate 30, configured to receive the containers C from the extraction means 22, in this specific case from the extraction gripper 22a as above, and support the containers C at least during the filling and weighing operation. The movement means 39 can also be provided to move such support plate 30, if provided or used.

According to embodiments in which the support means are configured as a support plate 30, this is provided with a plurality of support seatings 31 reciprocally disposed according to the configuration defined by the positioning matrix M1 as above in order to receive the group of containers C moved by the extraction gripper 22a.

In the embodiments in which it is provided to use the support plate 30 as a mean to make the containers C cooperate with the filling means 40 and the weighing means 33, each support seating 31 has, on the bottom surface, a shaped aperture 32 to allow the cooperation with the weighing means 33 which will be described in detail below (see for example FIGS. 8-11).

In embodiments which contemplate the use of the support plate 30, the extraction gripper 22a carries out a first movement of alignment with respect to the support plate 30 so as to vertically align the containers C with the underlying support seatings 31 with respect to the positioning matrix M1. Furthermore, the extraction gripper 22a is configured to, also, carry out a second movement, lowering itself, so that the containers C are inserted into the support seatings 31 (FIG. 6), to then slip away, essentially with a movement opposite the first movement, so as to disengage the containers C which therefore remain housed by the support seatings 31 of the support plate 30. It is also possible, alternatively, for the support plate 30 to be moved with respect to the extraction gripper 22a.

The support seatings 31 can be made in the thickness of the support plate 30 and have a depth such as to allow the lateral support of the containers C when they are positioned therein. In the example described here, the support seatings 31 have a circular section in accordance with a substantially cylindrical shape of the containers C. The support seating 31 can have a slightly larger transverse size than the transverse size of the container C so as to advantageously allow a stable positioning thereof, but with play to facilitate its subsequent pick-up.

As stated, in the embodiments in which it is provided to use the support plate 30 as a movement mean, in order to make the containers C cooperate with filling means 40 and weighing means 33 of the filling and weighing station 12 as described in detail below, each support seating 31 has, on the bottom surface, a shaped aperture 32 (FIGS. 7, 8, 9) to allow the cooperation with the weighing means 33, which are also suitably shaped, FIGS. 8, 9, 10, 11. For example, the shaped aperture 32 can have a conformation in which three angled arms depart from a central zone, for example the arms being equally angled by about 120° degrees each one with respect to the other, in particular being able to take a three-pointed star shape.

In some embodiments, which can be combined with all the embodiments described here, the weighing means 33 (FIGS. 8, 9, 10, 11, 12, 13, 14) comprise at least a scale 33a and a respective weighing plate 34 associated with this at least one scale 33a. Such at least one scale 33a can comprise, for example, a load cell or other weight detector. On said at least one scale 33a there is mounted a respective weighing plate 34 that has a plurality of positioning seatings 34*a*. In this way, the method therefore provides to weigh a plurality of containers C supported by a same weighing plate 34 by means of the associated scale 33*a* (FIGS. 8, 9, 10, 11, 12, 13, 14).

In some embodiments, therefore, the weighing method and the associated filling and weighing station 12 are able to weigh the tare of the containers C initially when they are empty and, subsequently, to measure the gross weight, when a container C has been filled. In particular, the tare is weighed only once for a plurality of containers C positioned in the positioning seatings 34*a* of the weighing plate 34 of a scale 33*a*, after which the containers C are filled one by one and, for each filling step, the net weight of metered product is obtained by calculating the difference with respect to the gross weight detected in the previous filling step, with the exception of the first filling step, where the calculation of the difference is carried out with respect to the single weighing of the tare as above.

In particular, in embodiments described using FIGS. 7, 8, 9, 10, 11, 12, 13, 14 and which can be combined with all the embodiments described here, each of the positioning seatings 34*a* as above is advantageously conformed to position, preferably in a stable manner a respective container C, for the purpose of weighing the metered quantity of product which is introduced by the filling means 40.

The weighing means 33 can include one or more scales 33*a* of the type described here. For example, the weighing means 33 can include a single scale 33*a*, which supports the weighing plate 34 with multiple positioning seatings 34*a*, or they can include a plurality of such scales 33*a* each equipped with a weighing plate 34 that has multiple positioning seatings 34*a*.

In some embodiments, it is possible to provide that there is one, or more than one, filling mean 40 for each scale 33*a*, but in any case a number lower than the number of the respective positioning seatings 34*a* of the respective scale 33*a*. In this case, such one or more filling means 40 can be mobile with at least two degrees of freedom, that is at least lateral displacement and lifting/lowering, in order to serve the plurality of positioning seatings 34*a* of the respective scale 33*a*. Alternatively, a plurality of filling means 40 can be provided for each scale 33*a* in a number equal to the number of the respective positioning seatings 34*a* and, in this case, the filling means 40 can be mobile with one degree of freedom, that is, lifting/lowering.

It should be noted here that, according to the present invention, the extraction means 22, or alternatively the support plate 30 or possibly other means able to pick up the plurality of containers C, can pick up a plurality of containers C, which belong to single row or to multiple rows of the container-holding tray 20, the number of which is equal to or greater than, favorably a multiple of, the number of scales 33*a* and filling means 40 provided, favorably a multiple.

In the embodiments described using FIGS. 8-14, the number of positioning seatings 34*a* for each weighing plate 34 can advantageously be two or more, for example three, four, five, six or even more than six. Such positioning seatings 34*a*, based on their number and on operating requirements, can also be disposed on several consecutive rows, each row being able to provide in this case two or more positioning seatings 34*a*, for example three, four, five, six or even more than six.

As described above, the weighing method can provide to move the containers C by means of the support plate 30 as above or directly by means of the extraction means 22 which have picked them up from the container-holding tray 20 or other suitable pick-up and movement means. In the possible variants, the mode by means of which the containers C are supported can change, for example supported on the bottom 45 thanks to the support seatings 31 of the support plate 30, or kept suspended from above, by means of the extraction gripper 22*a* holding the protruding annular edge 44 of the neck 41. This different support mode can also imply a different conformation of the weighing plate 34 used, and in particular how the plurality of positioning seatings 34*a* are made or defined, so that they are compatible respectively with the conformation of the support plate 30 or of the gripper 22*a* or of other pick-up and movement means.

Figure 10:
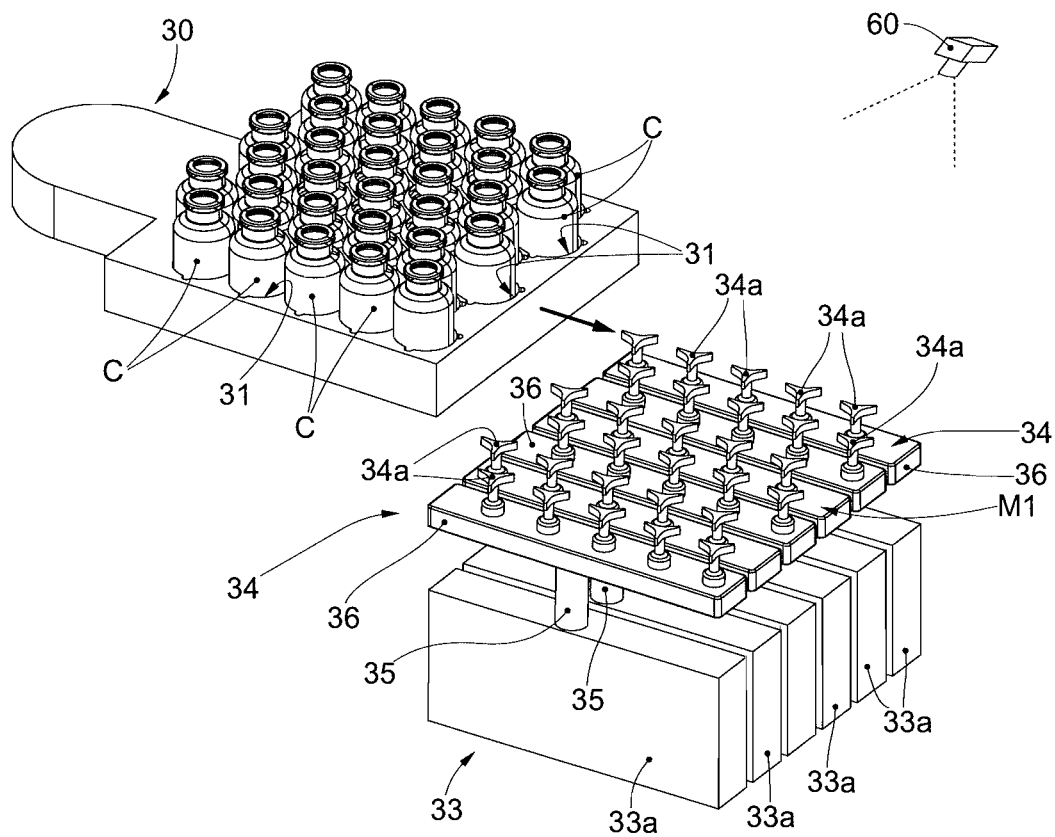
FIG. 10 is a perspective view of a support plate according to embodiments described here, on which containers are positioned, in cooperation with weighing means according to embodiments described here.

In particular, FIGS. 8, 9, 10 are used to describe embodiments in which the support plate 30 positions containers C with respect to filling means 40 and also with respect to weighing means 33 equipped with suitable weighing plates 34 described with reference to FIGS. 8-11. Alternatively, for this purpose it is also possible to directly use the extraction means 22 as above, in this case using for example weighing plates 34 described with reference to FIGS. 12-14. According to another alternative, it is also possible to use other pick-up and movement means, for example of the vacuum type, such as suction cups or suchlike.

In any case, the advantages are evident of being able to pick up and move a plurality of containers C which are, subsequently, subjected to filling and weighing by means of the weighing means 33 provided with a scale 33*a* with a weighing plate 34 that has a plurality of positioning seatings 34*a*: it is possible, in fact, to reduce the number of weight measurement errors, since there is a reduction in both the number of scales 33*a* used, since it is possible to even use a single scale 33*a* equipped with the weighing plate 34 described here for a given plurality of containers C, and also in the number of weighing operations. Furthermore, it is possible to eliminate or reduce uncertainties or differences in the measurement of the weight of the tare and therefore of the weight of metered product, to reduce the process times of a given group of containers and minimize the number of movements required.

For example, FIGS. 8, 9, 10 show example embodiments in which the support plate 30 positions containers C with respect to the filling means 40 (shown only in FIGS. 9 and 10) and in association with the weighing means 33. In this case, the support plate 30 can also be used to support the containers C during the weighing operation carried out by the weighing means 33 present therein.

In this case, the embodiments of the weighing plate 34 described using FIGS. 8, 9, 10, 11 are advantageously used in association with the support plate 30. In particular, in these embodiments the weighing plate 34 has a support shank 35 for a positioning plate 36, in particular disposed transversely to the support shank 35. The positioning seatings 34*a* are provided on the positioning plate 36. The support shank 35 is mounted on, or connected to, a respective scale 33*a*.

In these embodiments, a plurality of rods 37 project from the positioning plate 36 each of which supports a suitably shaped support element 38. Each support element 38 has an upper surface which defines a respective positioning seating 34*a*. Such support elements 38 are advantageously conformed or shaped in a manner mating with the shape of the apertures 32 of the support plate 30. In possible implementations, the support elements 38 can be shaped as radial arms, for example three as in FIGS. 8-11.

In particular, in these embodiments, thanks to the fact that the support elements 38 project, supported by the respective rods 37, from the positioning plate 36, it is possible to make the support elements 38 selectively pass through the apertures 32 of the support plate 30 so that each container C can be positioned, preferably in a stable manner, on the respective positioning seating 34a.

In other embodiments, not shown but the implementation of which is easily understood by a person of skill in the art, the support plate 30 is not used and the extraction means 22, in particular the extraction gripper 22a, directly position the containers C with respect to the filling means 40 and in association with the weighing means 33. In this case, the extraction means 22, in particular the extraction gripper 22a, can also be used to support the containers C during the weighing operation carried out by the weighing means 33 present therein.

Figure 11:
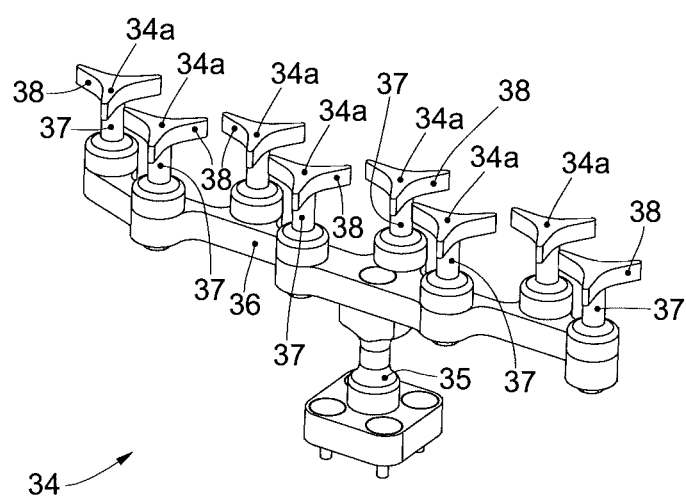
FIG. 11 is a perspective view of a weighing plate according to embodiments described here.
Figure 12:
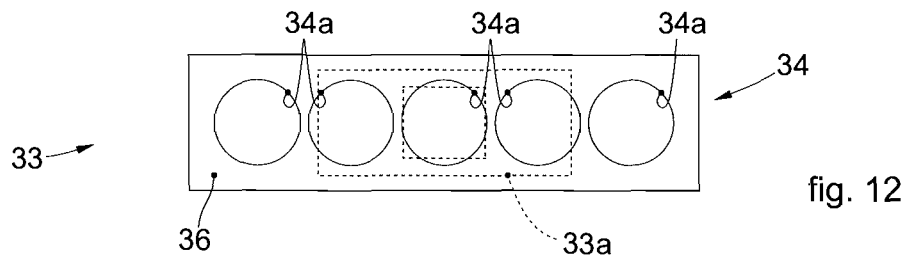
FIG. 12 is a schematic top plan view of weighing means according to embodiments described here.
Figure 13:
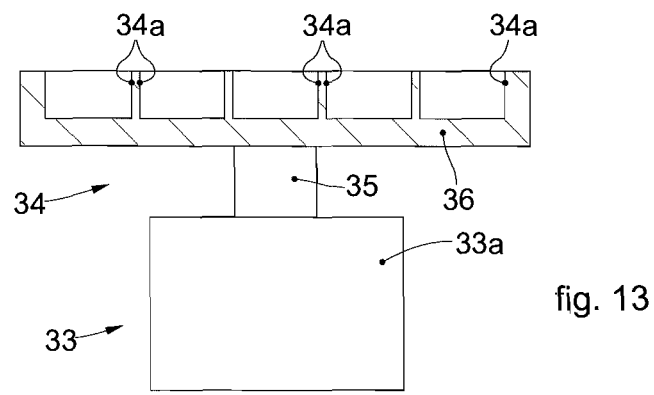
FIG. 13 is a partly sectioned schematic lateral view of weighing means according to embodiments described here.
Figure 14:
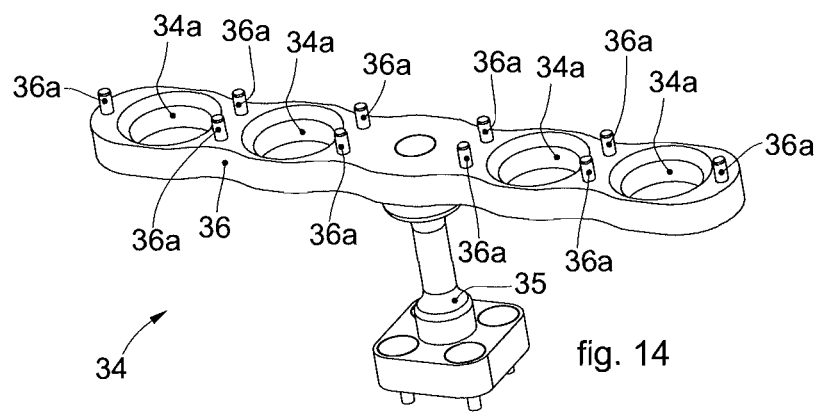
FIG. 14 is a perspective view of a weighing plate according to other embodiments described here.

In this further case, therefore, the embodiments of the weighing plate 34 described using FIGS. 12, 13, 14 are advantageously used in association with the extraction means 22, in particular the extraction gripper 22a. With regards to these embodiments, only the differences with respect to the weighing plate 34 of the embodiments of FIGS. 8-11 are described here, while the other parts or components are the same unless specified otherwise. Therefore, in these embodiments there are no support elements 38 supported by rods 37 projecting from the positioning plate 36, rather the positioning plate 36 has a plurality of positioning seatings 34a, which are made hollowed or recessed in the thickness of the positioning plate 36.

In particular, in these embodiments, the containers C carried by the extraction means 22 can be freely inserted from above into the respective positioning seatings 34a, since they are partly accommodated in them resting on their bottom, preferably in a stable manner.

In some embodiments, described using FIG. 14 and which can be also combined with the embodiments of FIGS. 8-11 and 12-13, the weighing plate 34 can have a plurality of protruding pegs 36a, disposed in correspondence with each positioning seating 34a. Advantageously, the disposition and conformation of such pegs 36a is aimed at a radial centering and containing function of the containers C positioned in the respective positioning seatings 34a. Such pegs 36a can for example be protruding from the corresponding weighing plate 36 and be disposed around each positioning seating 34a, as shown by way of example in FIG. 15 and as also possible in the embodiments described with reference to FIGS. 12 and 13.

As stated, the presence of the pegs 36a, with the same functions as above, can also be provided in the embodiments of FIGS. 9, 10, 11. In this case, the pegs 36a project from each of the respective support elements 38, in fact being disposed around the respective positioning seatings 34a. For example, in the event the support elements 38 are shaped as radial arms, the pegs 36a can be provided at the ends of each radial arm.

Furthermore, in the embodiments described using FIGS. 12, 13, 14, the positioning seatings 34a of a respective weighing plate 34 are disposed for example aligned with each other, however it is not excluded that the positioning seatings 34a can also be disposed with an offset or alternating spatial configuration, for example a "quincunx" configuration as in FIGS. 8, 9, 10, 11, or other spatial configuration or orientation. For example, as seen in FIG. 11, the positioning plate 36 can be suitably shaped in a manner mating with the desired disposition, in this specific case a "quincunx" disposition. According to the disposition of the multiple positioning seatings 34a provided in the weighing plate 34 which is described using FIGS. 8, 9, 10, 11, 12, 13, 14, the support plate 30 which carries the containers C, or the extraction gripper 22a in the event the support plate 30 is not used, is suitably moved with respect to the weighing means 33, so that there is coordination and alignment between the containers C and the multiple positioning seatings 34a as above.

In accordance with some embodiments of the weighing method described here, by using the support plate 30 or alternatively directly the extraction gripper 22a, or other suitable pick-up and movement means, a plurality of containers C are positioned simultaneously in each of the positioning seatings 34a of the weighing plate 34 of a respective scale 33a of the weighing means 33.

For example, the multiple positioning seatings 34a of each weighing plate 34 can be disposed in order to cooperate, for the purposes of the weighing, with one, two or more rows of containers C supplied by the support plate 30, without being extracted from the respective support seatings 31 in which they are housed, or alternatively supplied by the same extraction gripper 22a.

In the embodiments described here, see for example FIGS. 8-11, and also being valid in the event the extraction means 22 are used instead of the support plate 30 with reference to FIGS. 12-14, the support plate 30 is configured to carry out at least a first movement of alignment with respect to the weighing means 33 so as to vertically align the shaped apertures 32 with the positioning seatings 34a of each of the weighing plates 34 with respect to the positioning matrix M1, FIG. 8. In this case, the weighing plate 34 described using FIGS. 8-11 is used, where advantageously the projecting support elements 38, each of which has the respective positioning seatings 34a, are joined to the respective shaped apertures 32 so that the support elements 38 can pass through them. Furthermore, the support plate 30 is configured to also carry out a second movement, which in this case implies the passage of the support elements 38 and corresponding positioning seatings 34a through the apertures 32, so that the containers C are deposited, thanks to the presence of the apertures 32, each one in a respective positioning seating 34a (FIG. 9), and then rise again so as to disengage the support elements 38 and remove the containers C from the respective positioning seatings 34a.

In the case of the embodiments of FIGS. 8-11, also valid for the embodiments of FIGS. 12-14 suitably using the extraction means 22 instead of the support plate 30, this sequence of movements is repeated, making the support plate 30 progressively advance stepwise, coordinated with the distance between the rows of containers C and positioning seatings 34a, with respect to the weighing means 33, to ensure that all the containers C present on the support plate 30 are progressively set down in the respective positioning seatings 34a. Here the tare of the group of containers C present on the weighing plate 34 is weighed only once, after which each container C is filled. At the end of each filling operation of a specific container C the overall weight of the containers C present on the weighing plate 34 is measured and, by calculating the difference with respect to the weight measured in the previous step, which initially is the tare weight of the containers C and in the subsequent steps is, on the other hand, the gross weight measured in the previous filling step, the net weight of product metered into the specific container C is then calculated. In other advantageous embodiments, it is also possible that the sequence of movements described above may be carried out only once, since, thanks to the presence, on respective weighing plates 34, of a total number of multiple positioning seatings 34a at least equal to the number of containers C, the weighing of the tare of all the containers C present on the support plate 30 or on the extraction means 22 can be carried out simultaneously, at once, so as to then proceed with the sequential filling and the weighing of the quantity of product metered into all the containers C inserted in the positioning seatings 34a. At each filling step, by calculating the difference with respect to the tare weight initially determined, in the case of the first filling, or with respect to the gross weight detected in the previous filling step, it is possible to determine on each occasion the net weight of the product metered into each container C. This determination can advantageously be carried out by the command and control unit 50.

In the embodiments described here it is provided, in particular, to carry out an operation of weighing the tare only once for all the containers C which are disposed in the respective multiple positioning seatings 34a of a weighing plate 34 and therefore, by moving a greater number of containers C at a time, it is advantageously possible to reduce the number of times that the tare of the containers C is weighed, or to use a smaller number of scales 33a to process the weighing operations of a plurality of containers C.

In particular, by means of the weighing means 33, in which each scale 33a is provided with a specific weighing plate 34 that has a plurality of positioning seatings 34a according to the embodiments described here, it is advantageously possible to make the step of weighing the tare faster and more accurate and, therefore, considerably increase the productivity and precision of the weighing procedure and consequently of the entire processing cycle.

In fact, by means of the weighing plate 34 provided with a plurality of positioning seatings 34a, it is possible to position a plurality of containers C supported by the weighing plate 34 associated with the respective scale 33a and to weigh the tare of all such containers C once only, at the beginning of the weighing cycle of a determinate group of containers C.

Figure 15:
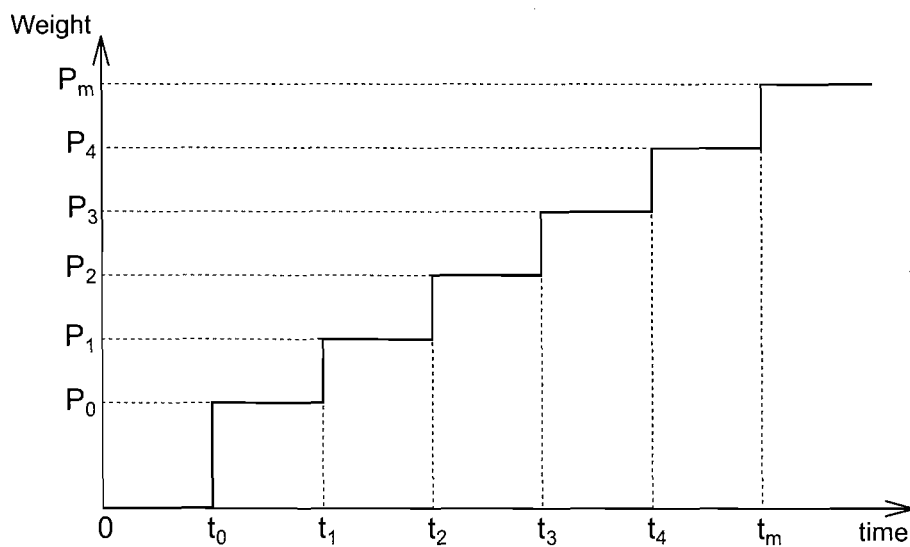
FIG. 15 is a graph showing the trend over time (x axis) of the weight (y axis) detected by weighing means according to the embodiments described here.

With reference also to FIG. 15, which shows a graph of the trend over time (x axis) of the weight (y axis) progressively detected by the scale 33a, it can be seen that at time t0, when for example all the containers C are positioned in the respective positioning seatings 34a and are empty, that is before the filling, the weight detected by the scale 33a at time t0 represents the weight of all empty containers C, that is the tare weight, or in any case of the reference value, or zero. This tare weight is the initial weight value with respect to which the subsequent weighing operation of the first container C which is filled by the filling means 40 is referred. In the graph of FIG. 15 the tare weight is indicated by P0, at the instant of time t0.

Subsequently, at time t1 a quantity of product is metered into one of the containers C and a weight P1 is detected, after which at time t2 a quantity of product is metered into another of the containers C and a weight P2 is detected, and so on, repeating these weight measurements incrementally for a number "m" of times equal to the number of positioning seatings 34a of each weighing plate 34, that is equal to the number of containers C to be filled and weighed on the same scale 33a.

With the exception of the first weight detected, before the filling is started, which is the tare weight of all the "m" containers C present in the positioning seatings 34a of each weighing plate 34 associated with a respective scale 33a, all the weights detected subsequently are gross weights, as a consequence of the sequential metering of product into each container C. So, for example the net weight of the product metered into the first container C that is filled will be given by the difference between the gross weight P1 detected and the tare weight P0 initially detected, while the net weight of the product metered into the second container C which is filled will be given by the difference between the gross weight P2 detected and the previous gross weight P1, and so on. It can therefore be said that the gross weight detected in a given weighing operation, subsequent to the first operation of weighing the tare when the containers C are empty, actually represents the reference weight with respect to which, in a subsequent operation of weighing the gross weight, the net weight of product metered in that given subsequent operation is calculated.

Therefore, in some embodiments, the progressive determination of the weight of product metered into a container C in a first filling step by means of said filling means 40 is carried out by calculating the difference between the weight detected by said scale 33a at the first filling step and said tare weight of said containers C initially detected by said scale 33a and, subsequently, the progressive determination of the weight of product metered into a container C, at each specific filling step following the first by means of said filling means 40, is carried out by calculating the difference between the weight detected at said specific filling step by said scale 33a and the weight detected by said scale 33a at the immediately preceding filling step.

In general, therefore, the net weight N(i+1) of product metered into a given container C at the instant of time i+1 by the filling means 40 will be defined by the difference between the current weight P(i+1) detected by the scale 33a and the weight P(i) detected by the same scale 33a in relation to the weighing immediately preceding time i:

$$N(i+1)=P(i+1)-P(i)$$

where i is a natural number ranging from 0 to m and m is the number of containers C which are disposed and supported in the positioning seatings 34a of the respective weighing plate 34 associated with a scale 33a.

As a consequence of the above, therefore, the graph of FIG. 15 can therefore be considered a "step" graph of the weight with respect to time, where each step represents an increase in weight detected by the scale 33a and the size of each step actually corresponds to the net weight of product metered in the specific filling step; it can therefore be said that the weighing method described here is a "step" weighing method.

In some embodiments, therefore, the weighing method provides to:
 pick up a plurality of empty containers C simultaneously from a container-holding tray 20 and move the plurality of containers C toward the filling and weighing station 12 to cooperate with the filling means 40 and the weighing means 33;
 position, by means of the extraction means 22 or by means of the support plate 30 into which the containers C have been transferred by the extraction means 22, a plurality of empty containers C in the positioning seatings 34a as above of each weighing plate 34 associated with a respective scale 33a, so that each container C is positioned, preferably in a stable manner, in a specific positioning seating 34a of the respective weighing plate 34;
 perform a weighing of the tare only once, weighing all the empty containers C initially present in the respective positioning seatings 34a of the weighing plate 34,
 sequentially fill each of the containers C, progressively determining the weight of product metered into a specific container C by means of the scale 33a, at each filling step, or after each filling step, without weighing the tare of each container for the given group of containers C to be filled and weighed.

If the weighing means 33 comprise a plurality of scales 33a, the steps of weighing the tare only once and sequentially filling and weighing the containers C of each weighing plate 34 can advantageously occur in parallel for each of the scales 33a provided.

As indicated above, in order to determine the weight of product metered into a specific container C by means of the scale 33a, after each filling step, the net weight N(i+1) of product metered by the filling means 40 in an instant of time i+1 is given by the difference between the weight P(i+1) detected in said instant of time i+1 and the weight P(i) detected in a previous instant of time i.

Consequently, it is evident that one advantage that is obtained with the embodiments of the weighing method described here is the possibility of incrementally measuring, for each of the containers C, the gross weight, and from there deriving the net weight N since the tare weight has been detected, in particular having advantageously performed the weighing of the tare not individually for all the "m" containers C to be weighed, but only once, at the beginning of the weighing cycle and with the same scale 33a. Therefore, these embodiments save m−1 operations of weighing the tare and m−1 movements of the containers C, with significant advantages of time, less wear of the movement members, lower energy consumption and less overheating of the automatic movement systems used.

Another advantage that is achieved, with respect to the state of the art which provides that each scale is provided with its own weighing plate with a single positioning seating to receive a corresponding container to be filled and weighed, is that of achieving greater weighing accuracy. In fact, by using a single scale to weigh a plurality of containers C by means of the respective weighing plate 34 it is possible to prevent multiple measurement errors from adding up, which, on the other hand, could occur if more than one scale is used. It is thus also possible to reduce errors due to setting the accuracy threshold of the tare weighing for the various scales used. Furthermore, the method described here allows to have fewer measurement errors since, for the same number m of containers C to be weighed, less measurements are made and therefore the error probability is smaller. In particular, with the method described here m+1 measurements are in fact carried out for weighing m net weights, also taking into account the initial weighing of the tare, while with the method of the state of the art 2*m measurements are carried out, implying weighing the tare and gross weight for each of the m containers.

The present invention, therefore, provides to weigh, with a single scale 33a and a single operation, the tare of a plurality of containers C at a time, thanks to the conformation of the respective weighing plate 34 which has multiple positioning seatings 34a, reducing the risk of introducing errors caused by weighing the tare for a given group of containers C to be weighed, in particular by means of different scales 33a.

In other words, thanks to the present invention it is possible to weigh the tare a smaller number of times, ideally a single time for a given group of containers C and also to use, compared to the state of the art, a smaller number of scales and, therefore, reduce the possibility of errors in the weighing of the tare introduced by the use of a greater number of scales.

This is especially important for minimum and precise quantities of metered product as in the pharmaceutical field, since the tare is weighed with a single scale, for several containers at the same time, preventing the propagation of errors that can instead be found in the state of the art, caused by different threshold or tare setting between the scales used.

At the same time, with the present invention it is possible to also weigh a greater number of containers C thanks to the fact that it is possible to simultaneously supply and move, by means of the extraction gripper 22a or alternatively the support plate 30, a plurality of containers C as described above.

It should be further noted, in any case, that the use of the support means as above, in this specific case of the support plate 30, can be optional. In fact, in possible embodiments, the filling and weighing of the containers C can occur directly using the extraction means 22, in particular the extraction gripper 22a, more particularly by moving the containers C held in position by the extraction gripper 22a in order to place them in cooperation with the filling means 40 and with the weighing means 33.

In the embodiments described here which for example involve the use of extraction means 22 and possible support plate 30 or other pick-up and movement means, it is evident there is a further advantage of moving a plurality of containers C picked up from the container-holding tray 20, possibly even all those present there, by means of the extraction means 22, advantageously provided with extraction gripper 22a, and moved by means of the support plate 30 or the extraction means 22 themselves. This, in particular, in terms of reducing the number of movements of the containers C connected to the weighing operations and therefore increasing the overall productivity of the processing line 10, lower energy consumption, lower overheating and wear of the respective movement means.

In accordance with some embodiments, for the purpose of picking up and moving the containers C from the container-holding tray 20, the weighing method comprises:

supplying a container-holding tray 20 containing a plurality of containers C disposed in an ordered manner, according to a pattern of rows and columns defined by the positioning matrix M1, moving, with respect to the container-holding tray 20, the extraction means 22 in the pick-up direction W and, by moving the extraction means 22, picking up, from the container-holding tray 20, at least two containers C disposed on at least one, possibly on at least two parallel and consecutive rows I, II of the positioning matrix M1.

Of these containers C, if the picking up occurs from several parallel rows, a first container C is positioned in a first row I and a second container C is positioned in a second row II, wherein the first row I is, with reference to the pick-up direction W, more external, in the positioning matrix M1, with respect to the second row II.

Picking up and moving such a group of containers C, comprising at least the first container C and the second container C of at least one row or possibly two parallel and consecutive rows as defined above, allows to speed up the movement and, in general, to reduce the displacements of the containers C between the processing stations, the movement times, the number of movements, reduce wear, overheating and energy consumption of the movement members and increase the overall productivity of the processing line 10. In fact, in this way fewer movements can be sufficient to pick up on each occasion all the containers C disposed in the container-holding tray 20 and transport them to the filling and weighing station 12.

According to the embodiments described here, the container-holding tray 20 and/or the extraction gripper 22a can be moved with respect to each other by respective movement means 39 for the purpose of picking up the plurality of containers C. For example, the extraction gripper 22a can carry out at least a first relative movement of engagement (pick-up direction W, FIGS. 3 and 4) with respect to the container-holding tray 20 in order to engage the at least a part of the group of containers C disposed in the housing seatings 21 of the container-holding tray 20, thus holding the containers C. It is also possible that, alternatively, the container-holding tray 20 is moved in accordance with the first relative movement of engagement with respect to the extraction gripper 22a.

Once the containers C have been engaged, a second movement can be performed, for example transverse, and in particular orthogonal, to the pick-up direction W, between the extraction gripper 22a and the container-holding tray 20 in order to extract the containers C from the latter. In possible implementations, for example, the extraction gripper 22a can also carry out at least a second relative lifting movement, transverse, and in particular orthogonal, to the pick-up direction W, with respect to the container-holding tray 20 so as to extract from the container-holding tray 20 the containers C held by the extraction gripper 22a, in order to move them to the next filling and weighing station 12, FIG. 5. Or, alternatively, the extraction gripper 22 can be kept stationary and the container-holding tray 20 can be moved, in particular with a movement of transverse descent, and in particular orthogonal, to the pick-up direction W.

Subsequently, the method described here can provide to move, by means of the extraction gripper 22a, the containers C toward the filling and weighing station 12, in particular toward the support plate 30, if provided, in order to deposit the containers C in the respective support seatings 31 of the support plate 30, FIG. 9, or directly toward the filling means 40 and associated weighing means 33. After this, the filling and weighing can be carried out as described above with reference to FIGS. 8, 9, 10. The support plate 30 is, in any case, conformed in such a way as to allow the filling and weighing of the containers C without these being extracted and/or removed from the support plate 30 itself, with an evident advantage in terms of operating time and with fewer movements. As previously described, as an alternative to the support plate 30 it is possible to directly use the extraction gripper 22a, selecting the appropriate type of weighing plate 34 represented for example in FIGS. 12, 13, 14.

Also in relation to the weighing operation, performed before (tare weighing) and after the filling, the support plate 30, if provided, is moved toward the weighing means 33, otherwise the extraction gripper 22a can be used directly.

In the embodiments described here, one or more rows of containers C present in the support plate 30 are aligned with respective scales 33a of the weighing means 33 so that the shaped apertures 32, in correspondence with one or more given rows of containers C to be weighed, are aligned with respective positioning seatings 34a of each weighing plate 34 associated with each scale 33a. If the support plate 30 is used, the support elements 38 of the weighing plate 34, on which the positioning seatings 34a are present, are conformed to cooperate with the shaped apertures 32 as above, so that said support elements 38 can pass through them, so that the containers C are set down on the positioning seatings 34a to determine the weight of the containers C in the course of the only operation of weighing the tare as described above and, subsequently, also determine the weight of the product metered into them on each occasion with the sequential filling carried out by suitable filling means 40, FIG. 9.

When one or more rows of containers C present in the support plate 30 are vertically aligned with respective positioning seatings 34a of the weighing plates 34, the support plate 30 and the weighing plates 34 carry out a movement which brings them reciprocally closer so that the containers C are positioned on the positioning seatings 34a, thanks to the presence of the respective shaped apertures 32 of the support plate 30 (FIG. 9), to perform the weighing operation, and a subsequent movement of relative distancing so as to release the support plate 30 from the weighing plates 34. In a possible solution, shown in FIGS. 8, 9, 10, the support plate 30 is mobile while the weighing plates 34 are fixed; the support plate 30 moves toward the weighing plates 34 so that the containers C, thanks to the respective shaped apertures 32 of the support plate 30, are positioned in the positioning seatings 34a of a respective weighing plate 34, to perform the weighing operation, and moves away from the weighing plates 34 so as to lift and remove the containers C from the positioning seatings 34a. However, we do not exclude embodiments in which, instead, the weighing plates 34 are vertically mobile to engage the containers C through the shaped apertures 32. In any case, in the embodiments described in which the support plate 30 is used for the purposes of weighing, the containers C can be partly or completely released from the support plate 30. In the case of complete release, it is intended that the lower plane of each container C reaches the upper plane of the support plate 30.

As indicated above, in other embodiments, instead of the support plate 30, the extraction means 22 as above, in particular the extraction gripper 22a, move the containers C toward the filling and weighing station 12 in order to cooperate with the filling means 40 provided in said filling and weighing station 12, providing to vertically align one or more rows of containers C present in the extraction gripper 22a with the filling means 40 as above. Furthermore, the extraction gripper 22a is also moved toward the weighing means 33 associated with the filling and weighing station 12, which in this case comprise one or more scales 33a each equipped with a respective weighing plate 34 according to the embodiments described using FIGS. 12, 13, 14. The weighing means 33 can in fact be essentially aligned or in any case in correspondence with the filling means 40. In this case, it is provided to vertically align one or more rows of containers C present in the extraction gripper 22a with respective weighing means 33 so as to align the containers C as above with the corresponding multiple positioning seatings 34a of each weighing plate 34 present on each scale 33a (FIGS. 12, 13, 14).

Furthermore, we do not exclude that the extraction gripper 22a can be used in combination with the embodiments of the scale 33a described with reference to FIGS. 8-11, in particular providing that the containers C can be positioned from above on the respective positioning seatings 34a of the specific weighing plate 34 described in these embodiments.

In the embodiments described here, therefore, the support plate 30, or alternatively the extraction means, in particular the extraction gripper 22a, or possibly other pick-up and movement means provided, move a group of containers C to be filled and weighed with respect to the weighing means 33 provided of the weighing plate 34 which has the multiple positioning seatings 34a. In this case, a number of containers C disposed for example along one row and advantageously equal to the number of positioning seatings 34a is positioned there, after which a single operation of weighing the tare is performed and, subsequently, by means of the filling means 40, the product is progressively metered into each of the containers C, detecting the weight on each occasion, as described above with reference to FIG. 15. The above operations of positioning a group of containers C in the positioning seatings 34a, initial weighing of the tare, progressive filling of each container C of the given group and corresponding weighing of the gross weight for the purpose of calculating, by calculating the difference, the net weight of product metered into the specific filled container C, are repeated as many times as the rows of containers C to be weighed, or a submultiple of the number of rows of containers C to be weighed, also based on the number and the disposition of positioning seatings 34a provided on the weighing plate 34 described with reference, for example, to FIGS. 8-14.

Furthermore, it should be noted that in the embodiments in which, as an alternative to the support plate 30, the extraction means 22, in particular the extraction gripper 22a, are directly used to move the containers C, it is preferable that, for the purposes of weighing by means of the weighing means 33, the containers C are suitably released from the extraction gripper 22a, so as not to distort the weight or transmit vibrations during the weighing step itself; this can be achieved by the particular conformation of the positioning seatings 34a described using FIGS. 12-14.

At the end of the filling and weighing operation, it can be provided to transfer the containers C, filled and possibly weighed, from the support plate 30, or from the extraction gripper 22a, to a subsequent processing station 14 as indicated above.

As already described above, we must specify in any case that, in possible embodiments, the containers C could be picked up from the container-holding tray 20 by means of other suitable pick-up and movement means, not necessarily configured as the extraction means 22 or the support plate 30, for example by means of vacuum pick-up means or other means which, for example, pick up and move the containers C keeping them gripped from above.

Figure 17:
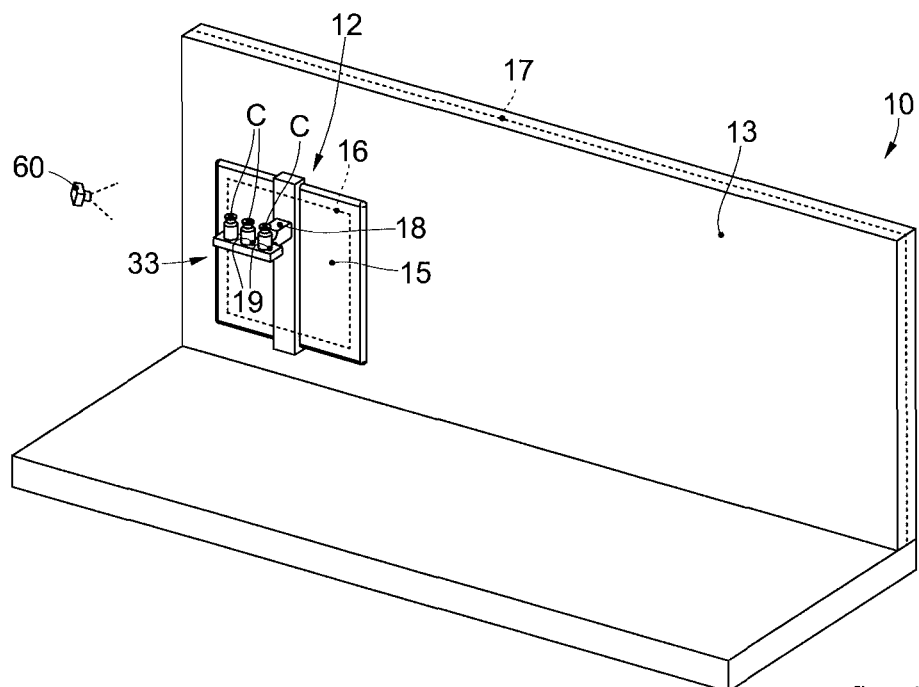
FIG. 17 is a perspective and schematic view of a detail of the weighing apparatus in FIG. 16 in accordance with a second embodiment, for weighing a plurality of containers supported by a single support member.

With reference to FIGS. 16 and 17, other embodiments are described of a weighing method and a filling and weighing station 12 which can be used to fill and weigh one or more containers C, which are configured to contain products of varying nature, both fluid and solid, and also in powder form. In these embodiments, the containers C as above are automatically transported from and toward one or more processing stations of the processing line 10, in contactless mode, for example with the use of planar motors.

FIG. 16, by way of example, shows the filling and weighing station 12 inserted in a processing line 10, which is configured to automatically fill the containers C and also transport them automatically from and toward one or more processing stations 11, 12, 14, 14A, 14B, 14C.

In particular, the processing line 10 can also comprise, in addition to the filling and weighing station 12, a station 11 for storing and picking up empty containers C, a closing station 14A, configured to close each container C, and a packaging station 14B configured to package, or wrap, the filled and closed containers C. Possibly a storage station 14C could also be present in the processing line 10, configured to store the packages, or packs, of the containers C ready for use.

It should be noted that the number and the disposition of the processing stations, which in FIG. 16 are shown aligned along a rectilinear path are described here and schematically represented only by way of example and to better illustrate the present invention. In fact, the disposition of the processing stations can be chosen at will as a function of the operational requirements for production.

In turn, the containers C can have different shapes, sizes and therefore containing capacity, from a few milliliters to several liters. Thus, for example, the containers C can have the shape of a bottle for drugs, with a capacity in the order of milliliters or centiliters, for example from 1 milliliter to 100 centiliters, or the shape of a vial with a capacity in the order of milliliters, for example from 1 to 100 milliliters, or that of a syringe, or a capsule, or other.

According to embodiments described using FIGS. 16 and 17, the processing line 10, and in particular the filling and weighing station 12, can be equipped both with filling means 40 (not shown in FIGS. 16 and 17), and also with dedicated weighing means 33 for weighing the containers C, in a similar manner to the embodiments described using FIGS. 1-15. Also in these embodiments there are, also, provided means configured to move the containers C with respect to the filling means 40 and weighing means 33, as explained in detail in the following description.

Also in the embodiments described using FIGS. 16 and 17, in a manner analogous to the embodiments described using FIGS. 1-14, the tare can be weighed, by means of the weighing means 33, only once for a plurality of containers C, after which the containers C can be filled one by one and, for each filling step, the net weight of the metered product is obtained by calculating the difference with respect to the gross weight detected in the previous filling step, with the exception of the first filling step, where the difference is calculated with respect to the single weighing of the tare as above.

However, in the embodiments described using FIGS. 16 and 17, the weighing means 33 are not configured as traditional scales, in particular load cells, as in the embodiments of FIGS. 1-15, but comprise electric energizing means 17, of a known type and not shown in detail, and control means configured to energize selectively and in a coordinated manner the electric energizing means 17 as above. In this specific case, these control means are configured and programmed to control the value of the electric current and/or voltage with which the electric energizing means 17 as above are powered in order to convert it into information on the weight and therefore on the mass of each of the containers C and/or of the product contained therein.

The processing line 10 according to the embodiments described using FIGS. 16 and 17, comprises a reference surface 13, which can be both vertical, as in FIGS. 16 and 17, and also horizontal, flat, inclined, curved, wavy, and irregular (these are not shown in the drawings).

The electric energizing means 17 as above are associated with the reference surface 13, which, in particular, are configured to selectively generate one or more magnetic fields, also distributed locally, in determinate zones of the same reference surface 13. For example, the electric energizing means 17 comprise a plurality of coils, not shown in the drawings, suitably disposed in correspondence with the reference surface 13.

One or more support members 15 are associated with the reference surface 13 (FIG. 17), each of which has the shape of a plate, a small board or a tile, for example with a rectangular base, and each provided with magnetic means 16, such as for example permanent magnets, of a known type and not shown in detail in the drawings. The magnetic means 16 are configured to interact with one or more of the magnetic fields generated by the electric energizing means 17 as above, so that each one of the support members 15 can be displaced independently, with respect to the reference surface 13 and slightly distanced from it, therefore without contact, from and toward a processing station 11, 12, 14 of the processing line 10, or to different positions within the same processing station, for example the filling and weighing station 12.

It should be noted here that the support members 15, by virtue of the magnetic interaction between the magnetic means 16 present therein and the magnetic fields selectively generated by the electric energizing means 17 as above associated with the reference surface 13 as above, can be supported at a desired distance from the reference surface 13 and be moved without contact along a desired trajectory, and therefore can advantageously support and/or move objects or products which, according to requirements, can be disposed on them, along the reference surface 13. The latter, therefore, represents the movement surface along which the support members 15 can be supported and moved without contact.

Therefore, in the embodiments described using FIGS. 16 and 17 the means as above configured to move the containers C comprised in the filling and weighing station 12 provide the reference surface 13 with which the electric energizing means 17 and one or more of the support members 15 as above are associated.

The selective energization of the electric energizing means 17 is controlled by the control means as above which, in the example provided here consist of, or comprise, a central processing unit, which can for example be the command and control unit as above described with reference to the embodiments of FIGS. 1-14 and which will be indicated hereafter with reference 50 (FIG. 16), such as for example a microcontroller, an industrial PC or a PLC (Programmable Logic Controller), also of a known type and programmable on the basis of the state of the art referred to the so-called planar motors, which have been studied and developed for over twenty years. In particular, the central processing unit 50 controls selectively and in a programmed manner the values of electric current and/or voltage to be supplied to the electric energizing means 17, so that the latter can cause both the support of each support member 15 in a determinate position of the reference surface 13, and also the selective movement of each support member 15 from one point to another of the same reference surface 13, both in the different positions within the filling and weighing station 12, and also from and toward one or the other of the processing stations of the processing line 10.

In accordance with some embodiments, shown in FIG. 17, each support member 15 comprises an arm 18 for supporting a plurality of seatings 19, or positioning seatings, which in the example provided here are three, in order to each receive and hold in position a single container C. As explained in detail hereafter in the description, the support arm 18 corresponds to the weighing plate 34 and the seatings 19 correspond to the positioning seatings 34a described with reference to FIGS. 1-15.

As described above, the filling and weighing station 12 comprises the weighing means 33 as above for determining the weight of each container C and/or of the product contained therein and, in these embodiments, the weighing means 33 comprise, or consist substantially of said electric energizing means 17 and said control means, for example the central processing unit 50.

In possible implementations, the weighing means 33, also, comprise, or are associated with, the support member 15 as above and the magnetic means 16 with which it is provided.

In particular, in some embodiments the weighing means 33 comprise the support member 15 provided with a support arm 18 that has the plurality of seatings 19 and magnetic means 16. The support arm 18 is therefore similar to the weighing plate 34 and the seatings 19 are similar to the positioning seatings 34a of the embodiments described using FIGS. 1-14. Here and in the claims, therefore, the expression support arm 18 can be replaced with weighing plate 34 and the expression seatings 19 can be replaced with positioning seatings 34a.

Figure 18:
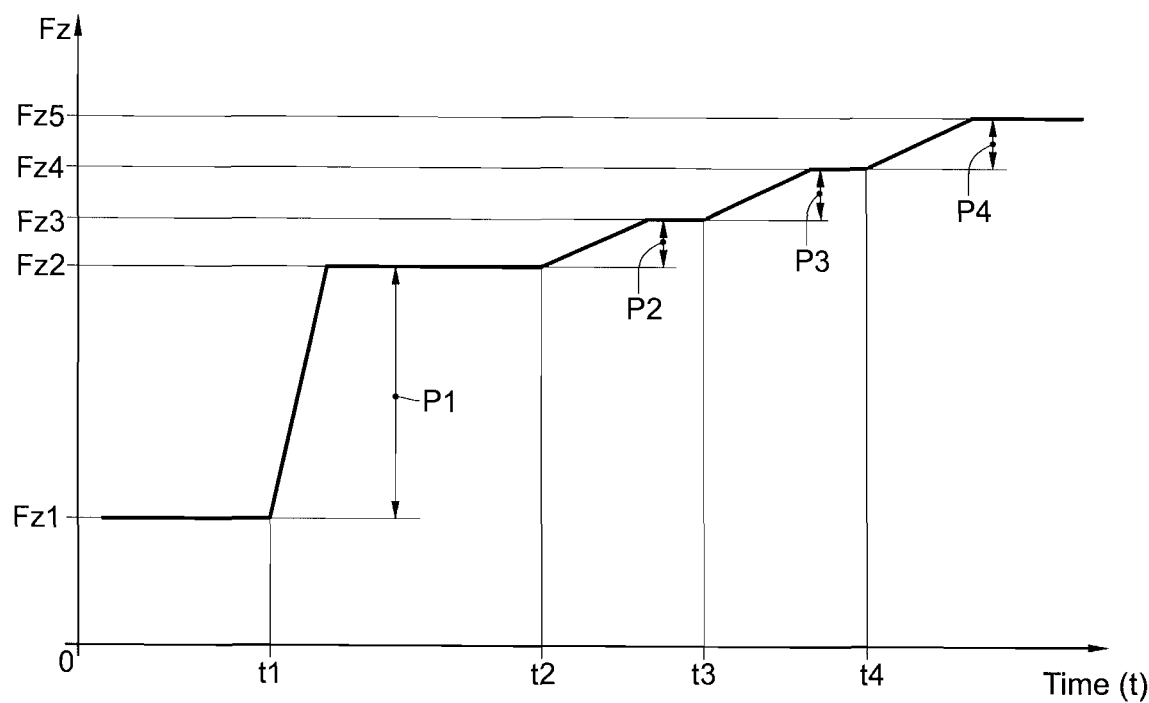
FIG. 18 is a graph that schematically shows the trend of the force (Fz) with respect to time (t), in the event that a plurality of containers is weighed.

In these embodiments described using FIGS. 16-18, moreover, it is also possible to define that the support member 15, since it is moved by interaction between the electric energizing means 17 and the reference surface 13, can perform, in relation to a plurality or group of containers C to be moved and transported, the function of means configured to move the containers C comprised in the filling and weighing station 12 similarly to the container-holding tray 20 or to the support plate 30 described using FIGS. 1-14.

As stated, the movement of the support members 15 occurs without contact with respect to the reference surface 13; in particular, a support member 15, when supported and moved without contact as described above, is supported distanced, and kept distanced, with respect to the reference surface 13, while it is moved without contact along the reference surface 13, by virtue of the magnetic interaction described above. This magnetic interaction has to therefore be sufficient to overcome the weight force of the support member 15, so as to keep it distanced from the support surface 13 and also move it without contact in a desired manner. The amount by which the support member 15 is distanced from the reference surface for the purpose of being supported and moved without contact is typically correlated to the value of electric current and/or voltage to be supplied to the electric energizing means 17.

In other words, a specific or desired distance between a support member 15 and the reference surface 13 is obtained and maintained, or varied, by supplying suitable electric current and/or voltage values to the electric energizing means 17, so that the support member 15 can be supported and moved without contact along the reference surface 13.

For example, it is possible to provide that, by providing a suitable electric current and/or voltage value, the support member 15 is supported and moved at a predetermined distance from the reference surface 13. Or it is possible to provide that, for example by varying the electric current and/or voltage value supplied, the support member 15 is initially supported and moved at one distance and subsequently at another distance or, again, that it is moved along a desired trajectory, in any case defining a contactless movement.

Therefore, it is possible to define, when the support member 15 is empty, that is no container, object or product is present on it, a condition of equilibrium in which the electric current and/or voltage value supplied to the electric energizing means 17 generates magnetic fields such as to support and move without contact the support member 15 on which no container, object or product is present at a desired distance or along a desired trajectory with respect to the reference surface 13. This balance can be modified when a container, object or product is disposed on the support member 15, since there is an increase in the weight force that it is necessary for the magnetic fields to overcome in order to keep the support member 15 supported and moved without contact on the reference surface 13 at the desired distance or along the desired trajectory.

As a consequence, in the embodiments described using FIGS. 16-18, thanks to the electric energizing means 17 and the control means, in this specific case the central processing unit 50, it is possible to determine the weight of the plurality of containers C supported by a support member 15, and in this specific case in the seatings 19 of the corresponding support arm 18, generally on the basis of the difference between the magnetic force necessary to support or move the support member 15 empty, that is on which no container C is present, compared to that required to support or move each support member 15 with on board the plurality of containers C.

In particular, according to possible embodiments, the present invention can determine the weight of the plurality of containers C supported by a support member 15 based on the difference in the value of the electric current/voltage required to support or move each support member 15 empty, that is on which no container is present, with respect to the one necessary to support or move each support member 15 with on board multiple containers C which are filled in sequence.

Therefore, on the basis of the difference in the value of the electric current/voltage necessary to support or move each support member 15 with multiple empty containers C on board, with respect to the one necessary to support or move each support member 15 with multiple containers C on board of which one or more are filled, it is possible to determine the weight and therefore the metering of the product contained in containers C.

Therefore, also in the embodiments described using FIGS. 16 and 17 it is possible to weigh the tare of all the empty containers C at a single time and, therefore, proceeding to the sequential filling of the containers C, it is possible to obtain, based on the difference on each occasion the weight of product delivered into each container C, without repeating the weighing of the tare. Also in this case it is possible to define a "stepped" time graph similar to FIG. 15, however favorably the steps considered are steps of force necessary to support the support member 15 in contactless mode and not directly of weight, since the embodiments of FIGS. 16 and 17, as explained above, detect the electric current or voltage powering the electric energizing means 17 which is then correlated with the force necessary to support of the support member 15 without contact and therefore with the weight. Therefore, in the embodiments of FIGS. 16 and 17 each step represents an increase in force and the size of each step is correlated to the net weight of product metered in the specific filling step; it can therefore be said that, also in the embodiments of FIGS. 16 and 17, the weighing method is "stepped".

In particular, FIGS. 17 and 18 are used to describe the "stepped" weighing of a plurality of containers C in accordance with the embodiments described here, supported by the seatings 19 of the support arm 18 of a support member 15. In particular, FIG. 18 is a graph that shows the time (t) on the x axis and the vertical component of the force (Fz) on the y axis. It should be noted that the vertical is the direction identified by the plumb on each point of the earth's surface. The graph of FIG. 18, as stated, is similar to the graph of FIG. 15, except for the use, on the y axis, of the force necessary to support the support member 15 without contact and not the weight of the containers C directly detected.

In FIG. 18, at time t=0 the electric energizing means 17 are driven to support or move the support member 15, on which no container C is present, and the vertical component of the force Fz is equal to Fz1. At the time t=t1 several containers C, for example three, are located on the support member 15 and, therefore, in order to support or move the support member 15-container C assembly, it is necessary for the electric energizing means 17, in a fraction of time following t1, to exert a greater force Fz equal to Fz2. Subsequently, at time t=t2 one of the containers C located on the support member 15 is filled and, therefore, in order to support or move the support member 15-containers C assembly of which one container C is filled, it is now necessary for the electric energizing means 17, in a fraction of time following t2, to exert an even greater force Fz equal to Fz3. Proceeding in the same manner, filling the remaining containers C one at a time, at time t3 and time t4 respectively, it will therefore be necessary to exert respectively a force Fz4 and a force Fz5 in order to support or move the support member 15 on which the gradually filled containers C are present.

Therefore, each step in the graph of FIG. 18 represents an incremental increase over time of the vertical component of the force Fz necessary to support or move the support member 15, on which the empty containers C are positioned (step P1) and, subsequently, the sequential filling of the containers C themselves (steps P2, P3, P4) occurs.

Therefore, by weighing a plurality of containers C positioned in the seatings 19 of the support arm 18, with the possible product contained therein a time (t)-vertical component of the force (Fz) graph is obtained, and the respective steps present in the graph in FIG. 18 are evaluated, similarly to what described above with reference to FIG. 15.

Therefore, also in the embodiments described using FIGS. 16-18, it is provided to stably position the containers C in each seating 19 of a respective arm 18 of a specific support member 15, weigh the tare of the containers C inserted in each seating 19 at a single time and sequentially fill each of these containers C by means of the filling means 40 as above, progressively determining, by means of the weighing means 33, the weight of product metered into each specific container C at each filling step, without repeating the weighing of the tare.

For example, again with reference to the indicative graph of FIG. 18, it can be noted that: in order to only support or move the support member 15 it is necessary to apply, by means of the electric energizing means 17, a first force Fz1, proportional to the weight of the support member 15 (first weighing sub-step); in order to support, or move, both the support member 15 and also a plurality of empty containers C, for example three, supported by the latter, it is necessary to apply, by means of the electric energizing means 17, in a fraction of time following t1, a second force Fz2, greater than the first force Fz1 (second weighing sub-step), therefore the difference Fz2−Fz1 is correlated only to the weight P1 of all the empty containers C loaded, that is to the weighing of the tare of the empty containers C which is performed only once for all the containers C present; in order to support, or move, both the support member 15, and also the containers C supported by the latter, and also the content introduced into a first container that has a weight P2, it is necessary to apply, by means of the electric energizing means 17, for example in a fraction of time following t2 a third force Fz3, greater than the second force Fz2 (third sub-weighing step), consequently the difference Fz3−Fz2 is correlated precisely to the weight P2: if a second container C is also filled with a quantity of product that has a weight P3, by means of the electric energizing means 17 and in a fraction of time following t3, a fourth force Fz4 is applied greater than the third force Fz3, therefore the difference Fz4−Fz3 is correlated to the weight P3 (fourth weighing sub-step); similarly, if a third container C is also filled with a quantity of product that has a weight P4, by means of the electric energizing means 17 and in a fraction of time following t4, a fifth force Fz5 is applied greater than the fourth force Fz4, therefore the difference Fz5−Fz4 is correlated to the weight P4 (fifth weighing sub-step).

In other possible embodiments, in the event that on a same support member 15 there are disposed at least two of said containers C which are filled simultaneously or in sequence, each with a determinate quantity of product, the difference between the second force Fz2 and the first force Fz1 is correlated only to the weight P1 of the empty containers C loaded onto the same support member 15. In these embodiments, the method provides to determine an overall force (which will in practice be an overall force equal to Fz4) applied by said electric energizing means 17 in order to support, or move, both the support member 15 itself, and also the at least two containers C, and the difference between the overall force Fz4 and the second force Fz2 is correlated both to the weight P2 of a first determinate quantity of product present in a first one of said containers C and also to a weight P3 of a second determinate quantity of product present in a second one of the containers C.

In some embodiments, the weight of the content that is, or has been, introduced into a single container C being known and therefore the amplitude of the corresponding strength step being known, it is also possible to contemplate filling, simultaneously or in sequence, further containers C present on the support member 15 and evaluating the overall weight thus obtained, on the basis of the amplitude of the overall step defined by the increase in force Fz, which is correlated, for example proportionally, to the force step identified for a single filled C container. Therefore, from this overall weight obtained, and knowing the number of containers C that have been filled, it is possible to derive an indication and a check of the weight of the content introduced into each of the other containers C.

In possible embodiments described using FIGS. 16-18, determining the weight of the content which is introduced into each container C occurs, as shown previously, by measuring the respective step P, which represents the increase in force necessary to maintain the support member 15 at a predetermined distance from the reference surface 13, and more generally in a predetermined spatial placement (position and orientation) with respect to the reference surface 13, or to move without contact, at a predetermined distance, or following a desired trajectory, the support member 15 with respect to the reference surface 13. For example, the predetermined distance or pose, or the trajectory that is traveled, can be the same distance or placement, or trajectory, that the support member 15 had, or was travelling, with respect to the reference surface 13 before the container was filled. Therefore, according to possible embodiments, the method provides to maintain a determinate spatial placement, as defined above, by varying the combination of forces to keep said spatial placement as the mass contained in the containers C varies, as they are filled and correlate this variation of forces with the difference between the weight before and after a specific filling operation. In order to evaluate the presence of n containers it is sufficient to evaluate whether the total step of force after the support member 15 has been loaded with all the containers C has an entity equal to n*m_cont*g with a tolerance that depends on the container, but in any case not tight (having indicated with n the number of containers, with m_cont the mass of the container and with g gravity acceleration). When checking the presence, in fact, a high level of precision is absolutely not required.

In order to obtain more precise weight measurements, it is possible to weigh each container individually, so as to measure the relative increase in force applied by the electric energizing means 17.

The weighing operation, or weight check, can be done both to determine how much the container C (assessing its mass) and/or its content actually weigh, and also to check that the product has been metered into the container C. In this second case, the mere assessment of the presence of the step in the graph of FIG. 18 is sufficient, without needing to determine its height, or its size.

In this way, the limit is given by the evaluation of the force and there is the advantage that the errors of several scales are not added up, as in the prior art which has in succession the operations and the stations for weighing the tare, metering/filling and weighing the gross weight.

In possible implementations, the control means, in this specific case the central processing unit 50, can be programmed to know in advance an expected weight, or expected weight range, for a specific object, product or container that is located on the support member 15, as well as possibly also an expected weight, or expected weight range, for the content introduced into the containers C. This knowledge of expected weight values, or weight ranges, can be used by the control means, in this specific case the central processing unit 50, as reference values or confidence interval to implement feedback control logics, for example by means of subsequent filling operations, or refills, in which the information on the metered mass is used to possibly meter a another quantity and reach a higher metering precision. The expected weight values, or weight ranges, can be varied according to the production cycle or the type of containers C and/or product that is introduced into the containers C.

In accordance with possible embodiments described using FIGS. 16-18, the mass (m) of the metered product can be assessed with a first-order approximation model, as follows:

$$\Delta m = m_{after} - m_{before} = (F_{z\_after} - F_{z\_before})/g$$

where g is gravity acceleration.

Gravity acceleration can be calculated in the known ways. For example in the ways described below:

$$g_{(\alpha, h)} = g_{\alpha=45°} - 0.5(g_{poles} - g_{equator}) \cdot \cos(2\pi/180 \cdot \alpha) - 3.086 \cdot 10^{-6} h$$

where:
$g_{poles}$=9.832 m/sec2
$g_{\alpha=45°}$=9.806 m/sec2
$g_{equator}$=9.780 m/sec2
α is the latitude expressed in degrees, and
h is the altitude expressed in meters above sea level.

Alternatively, gravity acceleration can be calculated experimentally with a sample of known mass, thus avoiding the error due to the different density between water and soil and between the different soils, the mathematical modeling errors of gravity acceleration and those related to the projection of the components of the force (in particular on the direction of the plumb).

A third way to obtain gravity acceleration is to use a gravimeter. This instrument is based on mechanical and/or electromagnetic and/or optical systems and is available on the market and allows to obtain the value of the gravity acceleration on any point whatsoever of the earth's crust.

Embodiments of the functioning of the filling and weighing station 12 described heretofore using FIGS. 16-18, which substantially corresponds to the weighing method according to such described embodiments, comprise:
  stably positioning a plurality of containers C in each
    seating 19 of a respective support arm 18 of the support member 15 which is advantageously comprised in the weighing means 33 as above;

obtaining the value of the tare weight of the containers C inserted in each seating 19 with a single measurement. This operation is in fact analogous and corresponds to carrying out the weighing of the containers C inserted in the positioning seatings 34a at a single time, in the embodiments described using FIGS. 1-14;

sequentially filling each of these containers C by means of the filling means 40, progressively determining by means of said weighing means 33, the weight of product metered into each specific container C at each filling step, without repeating any weighing of the tare.

In the method according to the embodiments of FIGS. 16-18, the weight, that is the weighing step, provides to use the electric energizing means 17 to obtain the information on the weight and therefore on the mass of each container C and/or of the product contained therein.

In particular, in this weighing step the value of the electric current and/or voltage with which the electric energizing means 17 are powered is detected in order to converted it into information on the weight and therefore on the mass of each container and/or product contained therein.

For example, the weighing step comprises the weighing sub-steps mentioned above. Advantageously, by means of the embodiments described using FIGS. 16-18 it is possible to weigh the tare of the containers C inserted in each seating 19 of the support arm 18 at a single time and sequentially fill each of these containers C by means of the filling means 40, progressively determining by means of the weighing means 33, the weight of product metered into each specific container C at each filling step, without repeating the weighing of the tare and the weighing operation is advantageously carried out by the weighing means 33 by means of the interaction between the electric energizing means 17 and the central processing unit 50 as above, without needing to provide specific and dedicated scales for this operation.

In other embodiments described with reference to FIGS. 16-18, the method can, alternatively, provide to maintain a determinate force, or combination of forces, applied to the support member 15 with respect to the reference surface 13. In particular, the method can provide to maintain the value of the electric current and/or voltage with which the electric energizing means 17 are powered. In this situation, the mass variation consequent to the metering of product into one of the containers necessarily causes a variation in the spatial placement, that is position and orientation as defined above, of the support member 15 on which the containers C are disposed. In this case, the method described here can provide that determining the weight of the content which is introduced into each container C is performed by detecting variations in the spatial placement of the support member 15 with respect to the reference surface 13; these variations can be converted into information on the weight and therefore on the mass of each of the containers C and/or of the product contained therein. The variation in spatial placement detected can, in fact, be advantageously correlated to the difference between the mass that the support member 15 is supporting and the mass supported by the support member 15 before the metering, thus obtaining the weight of product introduced into the container C in the specific filling operation.

From the above disclosure it is clear that the weighing step in the embodiments described using FIGS. 16-18 is automatically managed by the central processing unit 50, therefore the filling and weighing station 12 and the method described above allow to:

not have any additional weighing member, such as scales or suchlike, thus saving both at least one, often more than one, specific dedicated weighing instrument, and also the time required to move the containers C toward and from each weighing instrument;

obtain the information on the weight and therefore on the mass of each container C and/or its contents deriving it from the information on the force necessary to maintain the support member on which the container is housed at a pre-established distance with respect to a reference surface, or from the variation in the spatial placement of the support member, in the event that the method provides to maintain the combination of forces applied to the support member itself.

It is clear that the filling and weighing station 12 can be used both to understand whether a filling or a metering of the product has been carried out, or not, and also to determine the quantity of product that has already been inserted into the corresponding container C, and also to possibly calibrate the metering of the product, when necessary, also taking into account possible variations in accelerations, in addition to that of gravity, or decelerations.

The filling and weighing station 12 can be used at least in the filling or metering sector, not only of pharmaceutical products, in particular liquids and powders, but also in all types of packaging where a metering, for example, of food products, medicines, or powder products is involved.

In the filling and weighing station 12 of the embodiments described using FIGS. 16-18, by measuring the electric current or voltage, which requires to check the position of each support member 15 with respect to the reference surface 13, it is possible to determine the force exerted on the support member 15 (or more precisely its components expressed in any coordinate system whatsoever), so that the value of the vertical projection of this force, divided by gravity acceleration, and possibly added algebraically to other possible accelerations, or decelerations (dependent, for example but not exclusively, on the law of motion imposed on the support member), returns the value of the mass and therefore of the weight of each support member 15 and, therefore, of what it supports and transports, that is the plurality of containers C and their contents.

Furthermore, the possibility that the weighing means 33 in accordance with the embodiments described using FIGS. 16-18 do not comprise a specific physical scale gives the following additional advantages:

allows to not have one or more autonomous weighing stations, making it possible to save not only on the cost and size thereof, but also on the transport time from and toward these weighing stations;

consequently, not having one or more specific weighing stations, allows to have a more contained layout of the filling machine;

each individual container C, before it is filled, remains in the processing line 10 for a shorter period of time than what occurs in known filling machines provided with weighing instruments dedicated to measuring the weight of the empty containers, thus decreasing the probability of contamination from external agents;

allows to control, keep monitored, wash and sanitize a space with a smaller volume, thus providing considerable savings in terms of design time and costs for the isolator that normally envelops the processing line 10, further decreasing the possibility of contamination of the containers C;

the processing line 10 on which the filling and weighing station 12 is installed is more simple and minimal, having to integrate fewer components;

the cycle times of the processing line 10 can be further improved if the vertical projection of the force is measured not during a stop of the container C, but when it is in motion;

since when the container C is filled it does not have to stop in, and re-start from, a specific weighing station, which is not present in the processing line 10 equipped with the filling and weighing station 12, the possibility of spillage is reduced and the quality of the product contained in it increases, because the phenomenon of movement and rippling of the liquid inside the container and with respect to the container is limited;

when checking the weight is not required, there can in any case be provided an intrinsic check on the presence of the container C on the support member 15, before the filling, evaluating only the fact that there has been a variation of force which is not negligible and comparable to the weight of the empty container C, rather than evaluating its size, or on the completed metering after the filling, evaluating only the fact that there has been a variation of force which is not negligible and comparable to the weight of the metered product, rather than evaluating its size;

a secondary filling or metering station can be provided, ready to finely meter in order to correct a possible error in the primary one.

As a consequence of the above, the embodiments described using FIGS. 16-18, in addition to providing the main advantages of the embodiments described using FIGS. 1-15, allow to achieve the following purposes:

create a filling and weighing station and a weighing method, to weigh multiple containers configured to contain products of a various nature, both fluid, and solid, and also in powder form, without requiring specific physical weighing means dedicated to this weighing function;

overcome the known concept of having available an autonomous apparatus dedicated to weighing the containers and their possible content, but using other components, or means, already present in a filling machine, or in a filling station of a more complex machine, for performing the desired weighing, also and above all of the high precision type;

create a filling and weighing station and a weighing method, to weigh multiple containers, configured to contain products of a various nature, both fluid, and solid, and also in powder form, to be used preferably in a filling machine provided with transport means to automatically transport the containers as above from and toward one or more processing stations, including the filling station, wherein the same filling and weighing station comprises, and the weighing method uses, means, defined as weighing means, because they can perform this function, but which normally also perform other functions, so that it is no longer necessary to have one or more dedicated weighing devices, but wherein, instead, any weighing operation can be carried out in any zone, or processing station, in particular, but not only, in the filling and weighing station.

Furthermore, according to other embodiments, the weighing method described here can comprise a checking or inspection step, by means of optical acquisition, in particular of images or videos, to check for the presence or absence of containers C and/or the correct number of containers C and/or the correct position of the containers C.

For this purpose, there can be provided at least one suitable optical inspection assembly 60 (FIGS. 1, 4, 6, 8-10, 16, 17) associated with the filling and weighing station 12, and possibly also with the storage and pick-up station 11, for example comprising a video camera or similar optical or video inspection mean. The optical inspection assembly 60 can be advantageously connected to the command and control unit 50 as above, to which it supplies acquisition signals which are processed in order to provide feedback with regard to the check performed; possibly the command and control unit 50, as a function of the outcome of the check, can supply a signal or warning to an operator, whether automated, robotic or a human operator, to possibly intervene and solve a problem for example of a possible lack of containers C or incorrect positioning.

The optical inspection assembly 60 can be suitably positioned over a zone of interest to be inspected where there is a group of containers C to be transported, weighed and filled, so that a visual area of the optical inspection assembly 60 can inspect this group of containers C.

In particular, this checking or inspection step can be performed in relation to the containers C picked up by the extraction means (FIG. 4), or to verify the correct transfer of containers C from the extraction means 22 to the support plate 30 (FIG. 6) or also in relation to the disposition of the containers C on the positioning seatings 34*a* of the weighing plate 34 (FIGS. 8, 9, 10), or also in relation to the disposition of the containers C on the seatings 19 of the support member 15 with reference to the embodiments of FIGS. 16 and 17.

For example, according to a possible implementation, this step of checking by means of the optical inspection assembly 60 can be carried out when the extraction means 22, or other pick-up and movement mean, pick up a group of containers C from the container-holding tray 20 (see FIG. 4). In this case the checking or inspection step can advantageously be aimed at verifying whether the extraction means 22 have, or have not, picked up all the containers C.

Figure 6:
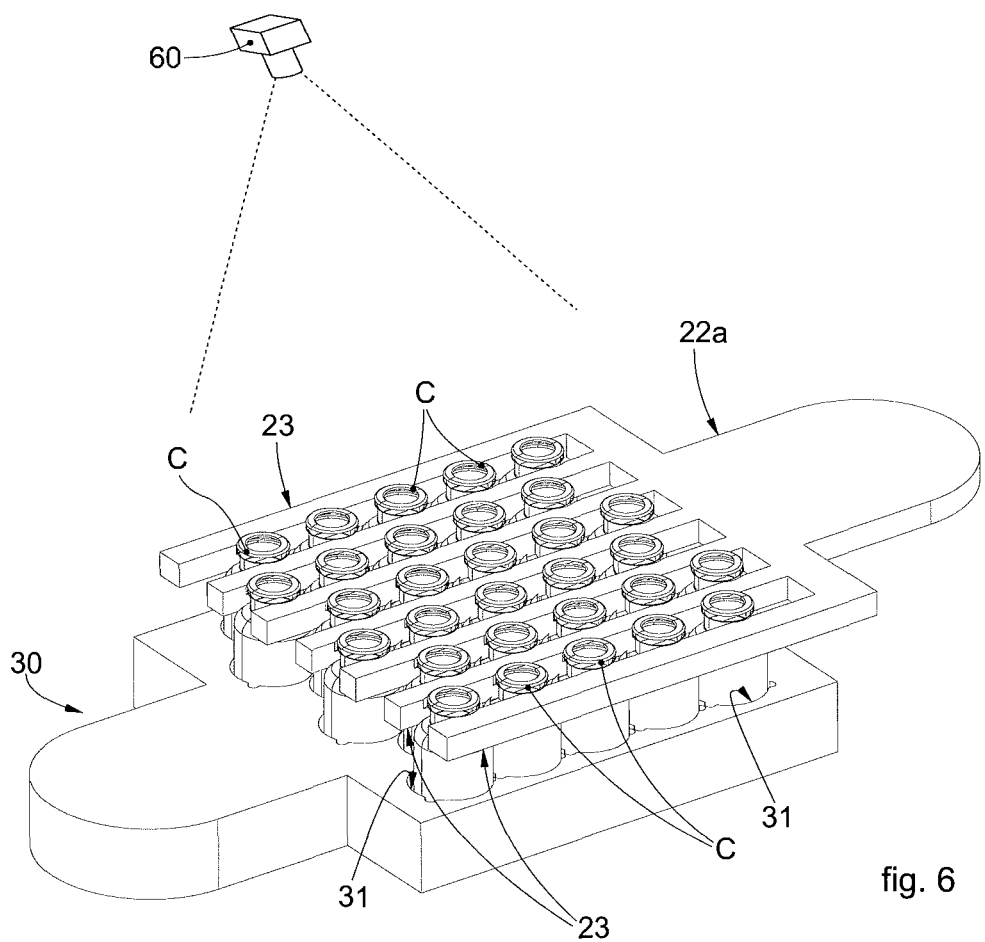
FIG. 6 is a perspective view of a support plate according to embodiments described here on which containers are positioned, in cooperation with extraction means.
Figure 7:
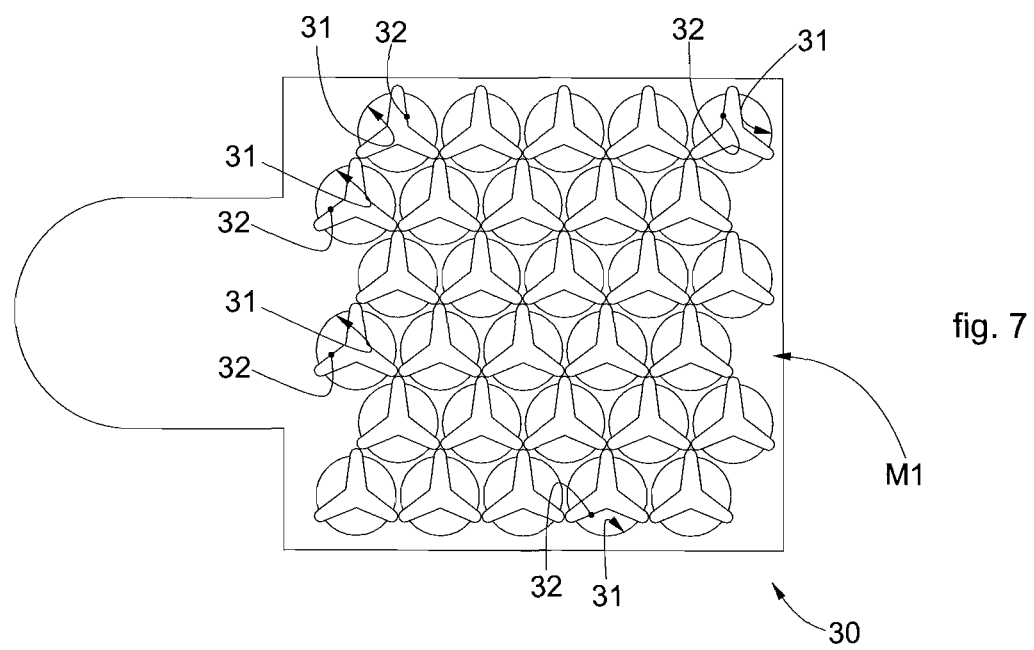
FIG. 7 is a top view of a support plate according to embodiments described here.

According to another example, which can be combined with the other examples described here, the checking or inspection step can be carried out if the transfer of the containers C from the extraction means 22 to the support plate 30 is carried out, also in this case for example to check the presence of all the containers C (see FIG. 6).

In accordance with yet another example, which can also be combined with the other examples described here, the checking or inspection step can be carried out when the extraction means 22, or the support plate 30, or other suitable pick-up and movement mean, position the containers C on the positioning seatings 34*a* of a respective weighing plate 34 of the weighing means 33, in order to check that all the containers C are disposed in the respective positioning seatings 34*a* (see FIGS. 8, 9, 10), or that they are correctly disposed in the seatings 19 of the support arm 18 of the support member 15 (see FIGS. 16 and 17). In this case, therefore, the presence of containers C on the respective positioning seatings 34*a* or seatings 19 can be advantageously checked, to verify that no containers C are missing with respect to those picked up. If necessary, in this case, the correct positioning of the containers C with respect to these positioning seatings 34*a* or seatings 19 can also be checked, to avoid that they are in a position that is unfavorable for weighing and/or filling.

It is clear that modifications and/or additions of steps and/or parts may be made to the method to weigh containers in a processing line, to the filling and weighing station and to the respective processing line as described heretofore, without departing from the field of the present invention as defined by the claims.

It is also clear that, although the present invention has been described with reference to some specific examples, a person of skill in the art shall certainly be able to achieve many other equivalent forms of a method to weigh containers in a processing line, of filling and weighing station and of the respective processing line, having the characteristics as set forth in the claims and hence all coming within the field of protection defined thereby.

In the following claims, the sole purpose of the references in brackets is to facilitate reading and they must not be considered as restrictive factors with regard to the field of protection claimed in the specific claims.

The invention claimed is:

1. Method to weigh containers in a processing line which comprises at least one filling and weighing station provided with filling means, and weighing means comprising a weighing plate, wherein said weighing plate is provided with a plurality of positioning seatings each configured to receive and support a corresponding container, and wherein said method comprises:
- making available a plurality of empty containers and moving them toward said filling and weighing station to cooperate with said filling means, and said weighing means;
- positioning said containers in each positioning seating of said weighing plate;
- weighing, by means of said weighing means, the tare of the containers inserted in each positioning seating at a single time;
- sequentially filling each of said containers by means of said filling means, progressively determining, by means of said weighing means, the weight of product metered into each specific container at each filling step, without weighing the tare of each container;
- wherein the net weight N(i+1) of product metered into a given container in the instant of time (i+1) by the filling means is defined by the difference between the current weight P(i+1) detected by said weighing means and the weight P(i) detected by said weighing means in relation to the weighing immediately preceding time i:

$$N(i+1)=P(i+1)-P(i)$$

where i is a natural number ranging from 0 to m and m is the number of containers that are disposed and supported in the positioning seatings of the respective weighing plate associated with said weighing means.

2. Method as in claim 1, wherein the progressive determination of the weight of product metered into a container at a first filling step by means of said filling means, is carried out by calculating the difference between the weight detected by said weighing means at the first filling step and said tare weight of said containers initially detected by said weighing means and, subsequently, the progressive determination of the weight of product metered into a container, at each specific filling step following the first by means of said filling means, is carried out by calculating the difference between the weight detected at said specific filling step by said weighing means and the weight detected by said weighing means at the immediately preceding filling step.

3. Method as in claim 1, wherein the positioning seatings of a respective weighing plate are disposed aligned with each other or are disposed in a staggered or alternating spatial configuration, in particular "quincunx".

4. Method as in claim 1, wherein said weighing means comprise at least one scale provided with said weighing plate, which has a support shank for a positioning plate on which said positioning seatings are provided.

5. Method as in claim 4, wherein said weighing plate has a plurality of rods projecting from said positioning plate which each support a support element that has an upper surface which defines a respective positioning seating.

6. Method as in claim 4, wherein the positioning plate of the weighing plate has a plurality of said positioning seatings made hollowed or recessed in the thickness of said positioning plate.

7. Method as in claim 1, wherein said weighing means comprise electric energizing means, control means and at least one support member which is provided with a plurality of said seatings and is configured to support a plurality of said containers and with magnetic means, wherein said electric energizing means are associated with a reference surface and are configured to selectively generate one or more magnetic fields, wherein said magnetic means are configured to interact with said one or more magnetic fields, so that said at least one support member can move independently and without contact, with respect to said reference surface, and wherein said control means are configured to selectively energize in a coordinated manner said electric energizing means to cause the contactless movement of said at least one support member from one point to another of said reference surface, wherein said control means control and detect the value of the electric current and/or voltage with which said electric energizing means are powered in order to convert it into information on the weight and therefore on the mass of each of said containers and/or of the product contained therein or said control means control and detect variations in the spatial placement of said support member to convert these variations into information on the weight and therefore on the mass of each of said containers and/or of the product contained therein.

8. Method as in claim 7, wherein said control means are configured to take into account both the gravity acceleration, and also any other accelerations, or decelerations, to which said at least one support member is subjected when it moves with respect to said reference surface.

9. Method as in claim 7, wherein the weight of said support member alone, the weight of said support member which supports a plurality of said containers empty for the purpose of weighing the tare of all the containers at a single time, and the weight of said support member which supports said containers of which at least one containing a determinate quantity of product following said sequential filling, is calculated by measuring the force applied by means of said electric energizing means to support, respectively, said support member alone, said support member with on it said, plurality of containers empty, and respectively said support member with on it said containers which at least one containing a determinate quantity of product.

10. Method as in claim 9, wherein said calculation provides to divide the value of the vertical projection of said force by the gravity acceleration, and possibly added algebraically to other possible accelerations, or decelerations, returning the value of the mass and therefore of the weight of each support member and, therefore, of what said support member supports and transports.

11. Method as in claim 7, wherein a plurality of said containers are housed or disposed on a same support member which are filled in sequence one at a time, each with a determinate quantity of product, wherein said weighing step comprises: a first sub-step in which in order to support, or move, only said support member with respect to said reference surface, a first force is applied by means of said electric energizing means, which is proportional to the weight of said support member; a second sub-step in which in order to support, or move, both said support member, and also a plurality of said empty containers, supported by said support member, a second force, greater than said first force, is applied by means of said electric energizing means, so that the difference between said second force and said first force is correlated only to the weight of said empty containers C present on said same support member; a third sub-step in which in order to support, or move, both said support member, and also said containers of which at least one contains a determinate quantity of product having a weight, a third force greater than said second force, is applied by means of said electric energizing means, so that the difference between said third force and said second three is correlated to the weight of a first determinate quantity of product of a first one of said containers, and that said weighing step, also, comprises at least a fourth sub-step in which in order to support, or move, both said same support member, and also said containers, in which at least a second of them contains a second determinate quantity of product having a corresponding weight, a fourth force, greater than said third force, is applied by means of said electric energizing means, so that the difference between said fourth force and said third force is correlated to the weight of said second determinate quantity of product.

12. Method as in claim 11, wherein a plurality of containers are housed or disposed on a same support member which are filled simultaneously or in sequence, each with a determinate quantity of product, said difference between said second force and said first force is correlated only to the weight of said empty containers loaded on said same support member and the method provides to determine an overall force applied by said electric energizing means to support, or move, both said same support member, and also said containers, and the difference between said overall force and said second force is correlated both to the weight of a first determinate quantity of product present in a first of said containers and also to a weight of a second determinate quantity of product present in a second of said containers.

13. Method as in claim 1, wherein it comprises a checking or inspection step, by means of optical acquisition, in order to check the presence or absence of containers and/or the correct number of containers and/or the correct position of said containers at least with respect to the positioning seatings of said weighing plate.

14. Station for filling and weighing containers, wherein it comprises filling means, weighing means comprising a weighing plate provided with a plurality of positioning seatings each configured to receive and support a corresponding container and means configured to move said containers with respect to said filling means, and/or weighing means, and control means configured to control and manage the functioning at least of said filling and weighing station according to the method of claim 1.

15. Filling and weighing station as in claim 14, wherein it comprises means for extracting containers to extract a plurality of said containers from a container-holding tray, wherein said means configured to move said containers comprise said extraction means to move said containers with respect to said filling means, and weighing means or comprise a possible support plate to move said containers with respect to said filling means, and weighing means.

16. Filling and weighing station as in claim 15, wherein it provides said support plate for moving said containers with respect to said filling means, and weighing means and in that said weighing plate has a plurality of rods projecting from said positioning plate and each supporting a support element that has an upper surface which defines a respective positioning seating, said support elements being conformed in a manner mating with the shape of apertures of the support plate in order to pass through said apertures and allow the containers to stably rest on the respective positioning seatings.

17. Filling and weighing station as in claim 15, wherein the positioning plate of the weighing plate has a plurality of said positioning seatings made hollowed or recessed in the thickness of said positioning plate and in which the insertion from above of said containers by means of said extraction means occurs.

18. Filling and weighing station as in claim 14, wherein said weighing means comprise at least one scale comprising said weighing plate, which has a support shank for a positioning plate on which said positioning seatings are provided, said support shank being connected or mounted on said scale.

19. Filling and weighing station as in claim 14, wherein it comprises an optical inspection assembly configured to check the presence or absence of containers and/or the correct number of containers and/or the correct position of said containers at least with respect to positioning seatings of said weighing plate.

20. Processing line for processing containers comprising a station for storing and picking up said containers and a filling and weighing station for said containers in accordance with claim 14.

21. Filling and weighing station as in claim 14, wherein said means configured to move said containers provide a reference surface with which electric energizing means are associated which are configured to selectively generate one or more magnetic fields, at least one support member configured to support a plurality of said containers and provided with magnetic means configured to interact with said one or more magnetic fields, so that said at least one support member can move independently and without contact, with respect to said reference surface and control means configured to selectively energize in a coordinated manner said electric energizing means to cause the contactiess movement of said at least one support member from one point to another of said reference surface, wherein said weighing means comprise said electric energizing means and said control means.

22. Filling and weighing station as in claim 21, wherein said control means are configured and programmed to control the value of the electric current and/or voltage with which said electric energizing means are powered in order to convert it into information on the weight and therefore on the mass of each of said containers and/or of the product contained therein or said control means are configured and programmed to control and detect variations in the spatial placement of said support member then in order to convert these variations into information on the weight and therefore on the mass of each of said containers and/or of the product contained therein.

23. Filling and weighing station as in claim 21, wherein said control means are configured and programmed to take into account both the gravity acceleration, and also any other accelerations, or decelerations, to which said at least one support member can be subjected when said support member moves with respect to said reference surface.

24. Filling and weighing station as in claim 21, wherein said weighing means comprise said at least one support member provided with said magnetic means.

25. Filling and weighing station as in claim 21, wherein said support member comprises a support arm provided with a plurality of seatings, to each receive and hold in position a single container, wherein said support arm defines said weighing plate and said seatings define said positioning seatings.

26. Method to weigh containers in a processing line which comprises at least one filling and weighing station provided with filling means, and weighing means comprising a weighing plate, wherein said weighing plate is provided with a plurality of positioning seatings each configured to receive and support a corresponding container, and wherein said method comprises:

making available a plurality of empty containers and moving them toward said filling and weighing station to cooperate with said filling means, and said weighing means;

positioning said containers in each positioning seating of said weighing plate;

weighing, by means of said weighing mean, the tare of the containers inserted in each positioning seating at a single time;

sequentially filling each of said containers by means of said filling means, progressively determining, by means of said weighing means, the weight of product metered into each specific container at each filling step, without weighing the tare of each container; and wherein said weighing means comprise electric energizing means, control means and at least one support member which is provided with a plurality of said seatings and is configured to support a plurality of said containers and with magnetic means, wherein said electric energizing means are associated with a reference surface and are configured to selectively generate one or more magnetic fields, wherein said magnetic means are configured to interact with said one or more magnetic fields, so that said at least one support member can move independently and without contact, with respect to said reference surface, and wherein said control means are configured to selectively energize in a coordinated manner said electric energizing means to cause the contactless movement of said at least one support member from one point to another of said reference surface, wherein said control means control and detect the value of the electric current and/or voltage with which said electric energizing means are powered in order to convert it into information on the weight and therefore on the mass of each of said containers and/or of the product contained therein or said control means control and detect variations in the spatial placement of said support member to convert these variations into information on the weight and therefore on the mass of each of said containers and/or of the product contained therein.

27. Station for filling and weighing containers, wherein it comprises filling means, weighing means comprising a weighing plate provided with a plurality of positioning seatings each configured to receive and support a corresponding container and means configured to move said containers with respect to said filling means, and/or weighing means, wherein said means configured to move said containers provide a reference surface with which electric energizing means are associated which are configured to selectively generate one or more magnetic fields, at least one support member configured to support a plurality of said containers and provided with magnetic means configured to interact with said one or more magnetic fields, so that said at least one support member can move independently and without contact, with respect to said reference surface and control means configured to selectively energize in a coordinated manner said electric energizing means to cause the contactless movement of said at least one support member from one point to another of said reference surface, wherein said weighing means comprise said electric energizing means and said control means.

* * * * *